United States Patent
Nanataki et al.

(10) Patent No.: US 7,816,847 B2
(45) Date of Patent: *Oct. 19, 2010

(54) DIELECTRIC ELECTRON EMITTER COMPRISING A POLYCRYSTALLINE SUBSTANCE

(75) Inventors: Tsutomu Nanataki, Toyoake (JP); Hirofumi Yamaguchi, Komaki (JP); Ritsu Tanaka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1405 days.

This patent is subject to a terminal disclaimer.

(21) Appl. No.: 11/180,298

(22) Filed: Jul. 13, 2005

(65) Prior Publication Data

US 2006/0012279 A1    Jan. 19, 2006

Related U.S. Application Data

(60) Provisional application No. 60/588,092, filed on Jul. 15, 2004, provisional application No. 60/646,746, filed on Jan. 25, 2005.

(51) Int. Cl.
*H01J 1/30* (2006.01)
*H01J 1/35* (2006.01)
*H01J 1/308* (2006.01)

(52) U.S. Cl. .................... 313/311; 313/310; 313/346 R

(58) Field of Classification Search ......... 313/495–497, 313/309–311
See application file for complete search history.

(56) References Cited

U.S. PATENT DOCUMENTS 5,453,661 A * 9/1995 Auciello et al. ............. 313/497
5,874,802 A    2/1999 Choi et al.
6,975,074 B2 * 12/2005 Takeuchi et al. ............ 313/310
2005/0073232 A1 * 4/2005 Takeuchi et al. ............ 313/311
2006/0012279 A1 * 1/2006 Nanataki et al. ............ 313/310

FOREIGN PATENT DOCUMENTS

| EP | 1 424 714 A1 | 6/2004 |
|----|--------------|--------|
| EP | 1 463 022 A2 | 9/2004 |
| JP | 44-26125 | 11/1969 |
| JP | 46-20944 | 6/1971 |
| JP | 1-311533 | 12/1989 |
| JP | 04-188503 A | 7/1992 |
| JP | 7-147131 | 6/1995 |
| JP | 2000-285801 | 10/2000 |
| JP | 2000328223 A * | 11/2000 |
| JP | 2001-152360 A | 6/2001 |

(Continued)

OTHER PUBLICATIONS

Takeuchi, Y. et al., "*Novel Display Panel Utilizing Field Effect-Ferroelectric Electron Emitters*," IDW. Proceedings of the International Display Workshops, XX, XX, Dec. 8, 2004, pp. 1193-1196, XP002987716.

(Continued)

*Primary Examiner*—Mariceli Santiago
(74) *Attorney, Agent, or Firm*—Burr & Brown

(57) ABSTRACT

A dielectric device of higher performance is provided. An electron emitter, to which the dielectric device is applied is provided with: an emitter including a dielectric; and an upper electrode and a lower electrode to which drive voltage is applied in order to emit electrons. The emitter is formed by the aerosol deposition method or the sol impregnation method.

24 Claims, 22 Drawing Sheets

FOREIGN PATENT DOCUMENTS

| | | |
|---|---|---|
| JP | 2004-146365 | 5/2004 |
| JP | 2004-172087 | 6/2004 |
| WO | 97/11476 | 3/1997 |

OTHER PUBLICATIONS

Yasuoka and Ishii "*Pulsed Electron Source using Ferroelectric Cathode*" J. Appl. Phys., vol. 68, No. 5, pp. 546-550, 1999.

V.F. Puchkarev, G. A. Mesyats "*On the mechanism of emission from the ferroelectric ceramic cathode*," J. Appl. Phys., vol. 78, No. 9, Nov. 1, 1995, pp. 5633-5637.

H. Riege "*Electron emission ferroelectrics-a review*," Nucl. Instr. and Mech., A340, pp. 80-89, 1994.

\* cited by examiner

FIG.14
(a) 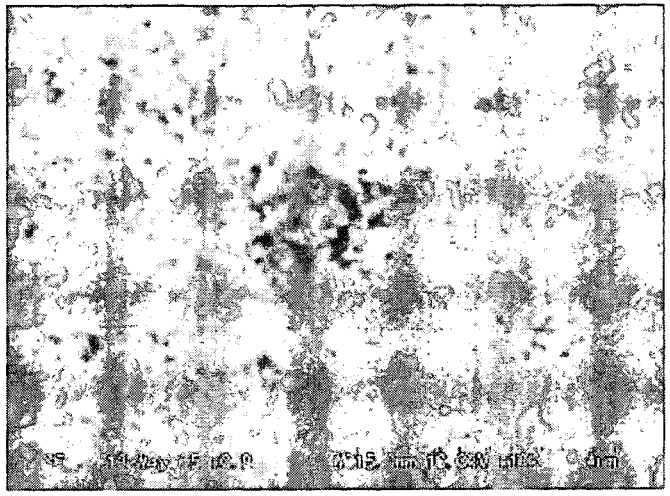
(b) 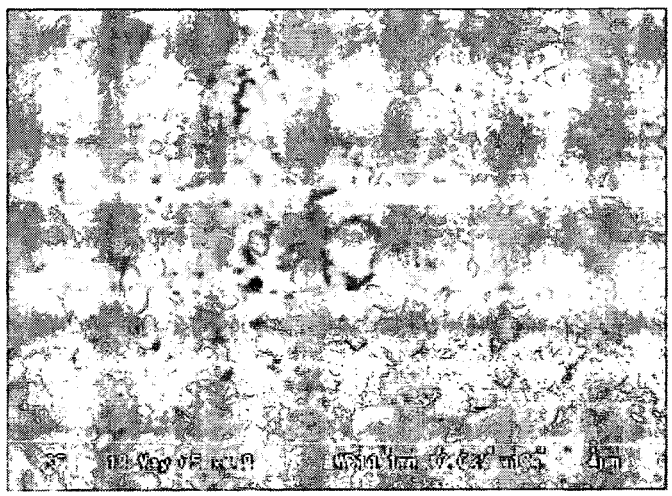
(c) 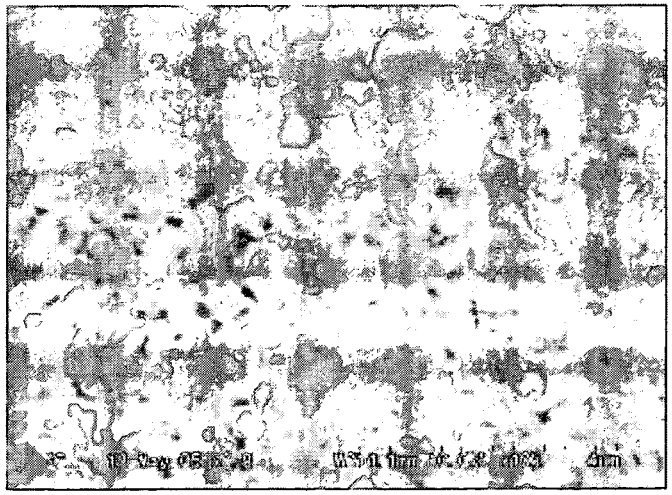

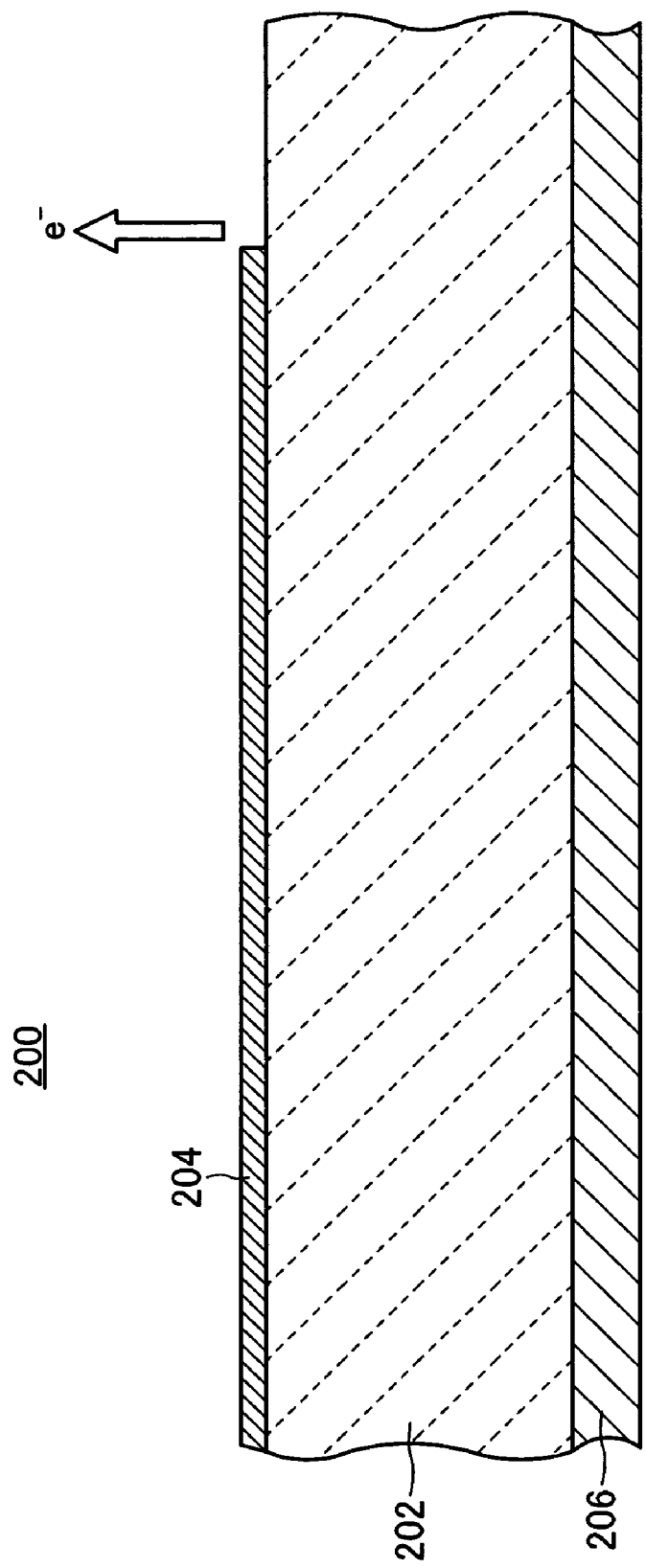

DIELECTRIC ELECTRON EMITTER COMPRISING A POLYCRYSTALLINE SUBSTANCE

This application claims the benefit of U.S. Provisional Application Ser. No. 60/588,092, filed Jul. 15, 2004, and U.S. Provisional Application Ser. No. 60/646,746, filed Jan. 25, 2005, the entireties of which are incorporated herein by reference.

BACKGROUND OF THE INVENTION

1. Field of the Invention

The present invention relates to an electron emitter that can be applied as an electron beam source in various devices, using electron beams, such as a display including a field emission display (FED), an electron beam irradiation device, a light source, electronic parts manufacturing apparatus, and an electronic circuit part.

2. Description of the Related Art

Such an electron emitter is, as is well known, operated in a vacuum of a prescribed vacuum level, and configured so that electrons are emitted from electron emission portions (hereunder referred to as "emitters") by applying a prescribed electric field to the emitters. When such an electron emitter is applied to an FED, plural electron emitters are arranged two-dimensionally and plural phosphors are disposed at prescribed intervals to the electron emitters so that each of the phosphors corresponds to each of the electron emitters. Then, an electron emitter at an arbitrary position among the plural electron emitters arranged two-dimensionally is selectively driven, electrons are thereby emitted from the electron emitter at the arbitrary position, the emitted electrons collide with the phosphor, thereby fluorescence is emitted from the phosphor at the arbitrary position, and thus an intended expression can be displayed.

Concrete examples related to such an electron emitter are, for example, Patent References 1 to 5 to be described later. In the documents, an electron emitter has been configured so that: it has an emitter including a minuscule conductive electrode having a sharp edge; and, by applying a prescribed drive voltage between a reference electrode disposed opposite to the emitter and the emitter, electrons are emitted from the edge of the emitter. Hence, in order to form such a minuscule conductive electrode, fine processing by etching, forming or the like has been required and that has caused production processes to be complicated. Further, a certain degree of high voltage has been required as the drive voltage in order to emit a prescribed amount of electrons from the edge of the conductive electrode into a vacuum of a prescribed vacuum level, and thus, as a drive element such as an IC, an expensive one withstanding the high voltage drive to drive the electron emitter has been required.

As stated above, the problem of the electron emitter using a conductive electrode as an emitter has been that the production costs of not only the electron emitter itself but also the device to which the electron emitter is applied increase.

To cope with the problem, an electron emitter using a dielectric as the emitter has been devised and disclosed in Patent References 6 and 7 below for example. Further, general knowledge on the electron emission in the case of using a dielectric as the emitter is disclosed in Non-Patent References 1 to 3 below.

The electron emitter disclosed in Patent References 6 and 7 (hereunder referred to simply as "conventional electron emitter") is configured so as to: cover a part of the upper surface of an emitter including a dielectric with a cathode electrode; and dispose an anode electrode at a position on or below the lower surface of the emitter or a position apart from the cathode electrode at a prescribed interval on or above the upper surface of the emitter. That is, the electron emitter is configured so that the exposed surface portion, where neither a cathode electrode nor an anode electrode is formed, of the emitter exists on the upper surface side of the emitter in the vicinity of the outer edge of the cathode electrode.

Then as the first step, voltage is applied between the cathode electrode and the anode electrode so that the cathode electrode has a higher potential, and the electric field formed by the applied voltage makes the emitter (the exposed portion in particular) get into a prescribed polarized state. Next as the second step, voltage is applied between the cathode electrode and the anode electrode so that the cathode electrode has a lower potential. At this time, primary electrons are emitted from the outer edge of the cathode electrode, the polarization of the emitter is reversed, the primary electrons collide with the exposed portion of the emitter where the polarization has been reversed, and thereby secondary electrons are emitted from the emitter (the exposed portion in particular). The secondary electrons fly toward a prescribed direction caused by a prescribed electric field applied from outside and thereby electrons are emitted from the electron emitter.

[Patent Reference 1] JP-A No. 311533/1989
[Patent Reference 2] JP-A No. 147131/1995
[Patent Reference 3] JP-A No. 285801/2000
[Patent Reference 4] JP-B No. 20944/1971
[Patent Reference 5] JP-B No. 26125/1969
[Patent Reference 6] JP-A No. 146365/2004
[Patent Reference 7] JP-A No. 172087/2004
[Non-Patent Reference 1] Yasuoka and Ishii "Pulsed Electron Source using Ferroelectric Cathode electrode," *J. Appl. Phys.*, Vol. 68, No. 5, pp. 546-550, 1999
[Non-Patent Reference 2] V. F. Puchkarev, G. A. Mesyats "On the mechanism of emission from the ferroelectric ceramic cathode electrode," *J. Appl. Phys.*, Vol. 78, No. 9, 1 Nov. 1995, pp. 5633-5637
[Non-Patent Reference 3] H. Riege "Electron emission ferroelectrics—a review," *Nucl. Instr. and Mech.*, A340, pp. 80-89, 1994

Meanwhile, in the case of the aforementioned conventional electron emitter, when electrons are emitted from a cathode electrode toward an emitter, electrons are emitted at the portion, on the surface of the cathode electrode, where lines of electric force concentrate and electric field intensity increases (here, the fact that lines of electric force concentrate on the surface of an electrode which is a conductor and thereby the electric field intensity at the portion where lines of electric force concentrate increases as stated above is hereunder referred to simply as "electric field concentration" and the portion where the electric field concentration occurs is hereunder referred to simply as "electric field concentrated portion").

Here, an example of a conventional electron emitter is schematically shown in FIG. 26. In a conventional electron emitter 200, an upper electrode 204 is formed on the upper surface of an emitter 202 and a lower electrode 206 on the lower surface thereof. The upper electrode 204 is formed on the emitter 202 in close contact therewith. In this case, the electric field concentrated portion is limited to the outer edge of the upper electrode 204 where the upper electrode 204, the emitter 202 and a vacuum intersect with each other, namely the triple junction. In the case of the conventional electron emitter 200, since the number of the electron emissive sites is limited as stated above, there have been such certain limitations as represented by the fact that drive voltage can only be increased up to the extent of not causing the dielectric breakdown of the emitter 202 even though an increase of the number of emitted electrons is tried.

SUMMARY OF THE INVENTION

The present invention has been established in view of the above problems and the object thereof is to provide an electron emitter capable of increasing the amount of emitted electrons.

A feature of the present invention aimed at attaining the above object is that an electron emitter including an emitter having a dielectric and a first electrode and a second electrode, formed on or above the emitter, to which drive voltage is applied in order to emit electrons from a upper surface of the emitter is configured as follows.

In the electron emitter according to the present invention, the emitter is composed of a dielectric layer formed by depositing fine particles of a dielectric through the aerosol deposition method. The aerosol deposition method is a method of forming a dense crystallized solid film through the processes of: dispersing powder into a gas and forming a smoky state (aerosol) using vibration or the like; thereafter conveying the formed aerosol to a film forming chamber under a prescribed reduced pressure; and spraying it on a prescribed substrate through a nozzle. By the aerosol deposition method, an emitter including a dielectric layer having scarce voids and a high packing density (for example, about 90 to 95% of the theoretical density) can be obtained. Hence, it becomes possible to form the emitter which has sufficient dielectric properties by only applying a heat treating process under the condition of relatively low temperature of 700° C. or 600° C. or lower (without applying sintering process by 900° C. or higher). Thus, it becomes possible to make the dielectric layer which comprises the emitter dense crystallized favorably; if the substrate is comprised of a material which upper allowable temperature limit is low such as glass or synthetic resin. And hence it becomes possible to provide an electron emitter having a high field intensity at the electric field concentrated portions and being excellent in electron emission capability by forming the emitter by the aerosol deposition method.

In addition, in the electron emitter according to the present invention, an air gap is formed between a face, of the first electrode, opposite to the upper surface of the emitter at the edge of the first electrode and the upper surface of the emitter. By adopting this configuration, the aforementioned triple junction is formed at a portion different from the tip of the edge of the first electrode (including the outer edge of the first electrode and, in the case where the first electrode has an opening as described later, the inner edge at the opening) and hence the electric field concentrated portion is formed also at the tip of the edge of the first electrode in addition to the aforementioned triple junction. Thereby the number of the electric field concentrated portions serving as electron emission sites increases more than ever and the amount of the emitted electrons at the electron emitter can be increased.

Here, it is preferable to dispose the second electrode to the lower surface side, namely on or above (below) the lower surface opposite with the upper surface of the emitter. Thereby the direction of the electric field applied to the emitter is identical to the thickness direction of the dielectric layer composing the emitter and only the first electrode is formed and disposed on or above the upper surface of the emitter. As a result, the area occupied by the electron emitter on a plan view reduces in comparison with the configuration wherein both the first and second electrodes are formed and disposed on the same surface of the emitter, and thus a higher degree of the integration of electron emitters becomes possible. In the case where electron emitters using the dielectric devices are applied to an FED in particular, the higher resolution of a display can easily be attained.

Further in this case, since an air gap (gap) is formed between the surface of the edge portion of the first electrode opposite to the upper surface of the emitter and the upper surface of the emitter, the electrostatic capacity of the virtual condenser formed between the surface of the edge portion of the first electrode opposite to the upper surface of the emitter and the upper surface of the emitter becomes smaller than that in the case where such a gap is not formed. As a result, most part of the drive voltage is substantially applied to the gap portion, and thus the field intensity at the edge of the first electrode increases and the amount of emitted electrons also increases in comparison with a conventional electron emitter not having such a gap as stated above.

Furthermore, it is preferable that the first electrode is provided with plural openings that expose the upper surface of the emitter toward the exterior of the dielectric device. Thereby triple junctions and the tips at the edge of the first electrode serving as electric field concentrated portions are formed also at the inner edges of the plural openings in addition to the outer edge of the first electrode. As a result, the number of the electric field concentrated portions serving as electron emission sites further increases and thus the amount of emitted electrons at the electron emitter can also be increased. In addition, since the electric field concentrated portions serving as electron emission sites are formed at the outer edge and the plural openings located inside the outer edge in the first electrode, uniform electron emission having less deviation and dispersion in the region occupied by the first electrode can be obtained.

Here, it is particularly preferable that the electron emitter, to which a dielectric device is applied, according to the present invention functions as follows: as the first step, electrons are emitted (supplied) from the first electrode to the emitter by applying such a drive voltage that the potential of the first electrode is lower than that of the emitter, namely electrons are accumulated on the emitter (the emitter is electrified); and as the second step, the electrons already accumulated on the emitter are emitted by applying such a drive voltage that the potential of the first electrode is higher than that of the emitter. This sort of functions can be carried out in the following manner for example.

As the drive voltage applied between the first and second electrodes, for example the voltage which is applied as pulse voltage or alternating voltage relative to a prescribed reference potential (for example, 0 V) is used.

Firstly, at the first step, a drive voltage is applied between the first and second electrodes so that the potential of the first electrode is lower than that of the reference potential and the potential of the second electrode is higher than that of the reference potential. Then, by the electric field caused by the drive voltage, the polarization of the emitter is directed toward such a direction that positive electric charge appears on the upper surface of the emitter, the electric field concentration occurs at the aforementioned electric field concentrated portions, and electrons are supplied from the first electrode to the emitter. Thereby electrons are attracted toward the positive electric charge appearing on the upper surface of the emitter and thereby accumulate at the portion, on the upper surface of the emitter, corresponding to an opening of the first electrode. That is, the portion, on the upper surface of the emitter, corresponding to the opening at the first electrode is electrified. At this time, the first electrode serves as the supply source of the electrons.

Next, at the second step, the drive voltage changes drastically, and the drive voltage is applied between the first and second electrodes so that the potential of the first electrode is higher than that of the reference potential and the potential of the second electrode is lower than that of the reference potential. Then, by the electric field caused by the drive voltage, the polarization direction of the emitter is reversed and negative electric charge appears on the upper surface of the emitter. Thereby, at the first step, the electrons attached to the portion, on the upper surface of the emitter, corresponding to the opening of the first electrode undergo electrostatic repulsive force caused by the polarization reversal and thereby fly from the upper surface of the emitter, and the flown electrons are emitted outside through the opening.

According to such functions, the amount of electrostatic charge at the emitter can be controlled relatively easily at the first stage and hence controllability that is stable and allows a large amount of electrons to be emitted can be secured. In particular, the configuration formed by disposing the first electrode having an opening on the upper surface of the emitter and the second electrode on the lower surface of the emitter is the most suitable as the configuration of an electron emitter for the functions.

Further, an opening, of the first electrode, secluded from the upper surface of the emitter can function as a gate electrode or a focusing electron lens for the electrons emitted from the upper surface of the emitter and hence the linearity of the emitted electrons can also be improved.

Furthermore, a feature of the present invention is that the edge of the first electrode has such a shape as to concentrate the lines of electric force. Such a shape of an edge as to concentrate the lines of electric force can be implemented, for example: either by disposing a portion having an acute-angled shape on the inner wall surface of the edge in sectional side view, or by attaching to the inner wall surface protrusions or conductive fine particles the size of which is equal to or smaller than the thickness of the first electrode. Otherwise, it can also be implemented by forming the inner wall surface of the edge into a hyperbolic shape (particularly a hyperbolic shape configured so that both the upper end and lower end portions of the edge portion in a sectional side view have acute angles). Otherwise, such a shape of the first electrode as to concentrate the lines of electric force at an edge can also be implemented by various means in addition to the above measures. Thereby the degree of the electric field concentration at the tips of the edges of the first electrode (the outer edge of the first electrode and the inner edge of an opening) rises and the amount of the electrons emitted from the tips to the emitter can be increased.

In addition, a feature of the present invention is that the first electrode is the aggregation of conductive particles having a shape extending in the longitudinal direction in a sectional side view and the conductive particles are arranged so that the longitudinal direction is parallel with the upper surface of the emitter. Thereby it is possible to easily realize such a shape as stated above having an air gap between the face of the edge portion of the first electrode, opposite to the upper surface of the emitter and the upper surface of the emitter (hereunder referred to simply as "overhanging shape" occasionally).

Here, as the conductive particles, composing the first electrode, having a shape extending in the longitudinal direction in a sectional side view, various shapes of particles can be adopted, for example: particles of a scale-like shape, a disc-like shape, a coiled spring-like shape or a hollow cylindrical shape; or particles of, in a sectional side view, a rod-like shape, an acicular shape, a hemispherical shape, an elliptical shape or a semi-elliptical shape. Then the conductive particles are arranged in plurality on the upper surface of the emitter so that the longitudinal direction thereof is along the upper surface of the emitter. In this case, the longitudinal direction is not necessarily parallel precisely with the upper surface of the emitter and it is generally acceptable if the conductive particles are arranged on the upper surface of the emitter in the state of "lying" to the extent of forming the gap or overhanging shape causing such functions as described earlier. For example, it is preferable that an angle between the longitudinal direction of the conductive particles and the upper surface of the emitter in a sectional side view is about 30 degrees or less.

Further, in the case where the first electrode has an opening, it is preferable that the opening is formed by the outer edges of plural conductive particles. That is, merely by arranging the conductive particles in plurality on the upper surface of the emitter by coating or another means, a space surrounded by the outer edges of the adjacent conductive particles in a plan view is formed and thus the opening having the aforementioned overhanging shape can easily be formed.

Furthermore, it is preferable that the first electrode is formed by arranging the primary particles of the conductive particles and/or the secondary particles formed by assembling the primary particles in plurality along the upper surface of the emitter and the length of the primary or secondary particles in the longitudinal direction in a sectional side view is larger than the average grain size of the crystal grains on the upper surface of the emitter. That is, the dielectric layer composing the emitter is generally a polycrystalline material and concavities are likely to form at the crystal grain boundaries or the junctions of the powder particles. Hence, as long as the concavities are utilized, merely by arranging the primary or secondary particles of the conductive particles in plurality on the upper surface of the emitter, the aforementioned overhanging shape can easily be formed.

Still further, it is preferable that the first electrode is comprised of graphite. Here, the graphite powder is conductive particles of a shape having relatively sharp edges, such as a scale-like shape, a flake-like shape or the like. In other words, it has a shape extending in the longitudinal direction in a sectional side view. Hence, by composing the first electrode of the graphite powder, it is possible to easily form gaps (air gaps) between the emitter and the edges of the first electrode, overhanging shape at the edges of the first electrode, and a shape allowing the lines of electric force to concentrate at the edges of the first electrode, as stated above.

Still further, it is preferable that the first electrode further contains conductive fine particles. In addition to that, it is preferable that the conductive fine particles are deposited also on the upper surface of the emitter. Thereby, since the fine particles exist on the upper surface of the first electrode like protrusions, the fine particles can serve as electric field concentrated portions by the effect of the protrusions and hence the sites of electron emission can further be increased.

In addition, it is more preferable that the fine particles are deposited also on the upper surface of the emitter corresponding to the edges of the first electrode. Thereby fine float electrodes including the fine particles are formed on the emitter composed of a dielectric. The float electrodes are suitable for abundantly accumulating electrons emitted from the first electrode to the emitter and can further increase the amount of the emitted electrons at the electron emitter. Consequently, by forming the float electrodes with the fine particles, it becomes possible to form the float electrodes on the upper surface of the emitter through a simple process, for example, a process of coating the upper surface with the fine particles together with the material composing the first electrode when the first electrode is formed on the upper surface of the emitter.

Furthermore, it is preferable that the fine particles are comprised of silver. Thereby it becomes possible to produce the first electrode containing conductive fine particles easily at a low cost. In particular, when graphite is used as the first electrode and a heating process in an atmosphere containing an oxygen gas is included in the process of forming the first electrode, the graphite around fine silver particles is oxidized and eroded during the heating process. Thereby an edge of the first electrode is likely to have a sharp tip or an opening is likely to be formed by the perforation in the interior of the electrode. As a consequence, the electric field concentrated portions further increase and a more preferable electrode shape can be obtained.

Here, the first electrode stated above can be formed on the emitter by the following method.

That is, the first electrode is formed by: preparing paste produced by dispersing in a dispersing medium conductive particles having a shape extending in the longitudinal direction in a sectional side view; forming a film including the paste on the upper surface of the emitter; and heating the film at a temperature lower than the sintering temperature of ceramics (a preferable temperature is around 500° C.).

Thereby (by properly adjusting the viscosity and compounding ratio of the paste), it becomes possible to put conductive particles in the state of "lying" as stated earlier by the effects of the self-weight, the surface energy and others of the conductive particles after the aforementioned film forming and before the heating of the film is finished and to easily produce a preferable electron emitter having gaps (air gaps) between the emitter and the openings of the first electrode and overhanging shapes at the openings of the first electrode. Further, it is possible to combine the process of forming the first electrode and the process of heat-treating the emitter as stated above.

Further, in the above production method, it is preferable to disperse conductive fine particles in the dispersing medium when paste is prepared. Thereby it becomes possible to easily produce an electron emitter having a larger number of electric field concentrated portions and an increased amount of emitted electrons as stated above.

A feature of the present invention is that a dielectric device has a dielectric layer and metal is mixed with the dielectric layer. Specifically, for example, metal is mixed with the dielectric layer in the form of fine powder and/or films in a dispersed state. Or the dielectric layer is composed of many dielectric fine particles and the metallic fine particles or the like are interposed among the adjacent dielectric fine particles.

Mixing the metal with the dielectric layer may be performed simultaneously with forming the dielectric layer. For example, mixing the metal with the dielectric layer may be performed with spraying the dielectric particles and metallic particles on the prescribed substrate at the time of forming the dielectric layer by the aerosol deposition method. Instead of this, mixing the metal with the dielectric layer may be performed after forming the dielectric layer.

It is preferable that the metal is mixed with the dielectric layer in the state of dispersing in the dielectric layer (in a dispersed state so as to exist discontinuously). Or otherwise the metal is arranged so as to disperse at the interface between a prescribed substrate to support the dielectric layer and the dielectric layer. Here, the term "discontinuously" represents the state wherein gaps exist among metallic fine particles and/or metal films adjacent to each other along the thickness direction so as not to yield electric conductivity over the thickness direction of the dielectric layer (namely from the upper surface to the lower surface of the dielectric layer).

By such a configuration, in a dielectric device utilizing the characteristics of a dielectric layer (dielectricity, electrical to mechanical transfer characteristic (piezoelectric/electrostrictive characteristic), and others), the voids in the dielectric layer are filled with the aforementioned metal and thereby the dielectric constant of the dielectric layer increases. As a consequence, the present invention makes it possible to obtain a high performance dielectric device having a dielectric layer of good characteristics.

In a dielectric device having a dielectric layer formed by using dielectric fine particles as the material and using the aerosol deposition method in particular, the aforementioned metal functions as a bond by the ductility thereof and thereby the capability of forming the dielectric layer improves. The capability of forming the dielectric layer improves conspicuously when plural kinds of dielectric fine particles are used as the material (for example, when coarse particles of a large average particle size and fine particles of a small average particle size are used as the material and the dielectric layer is composed of the coarse particles and fine particles, or when plural kinds of dielectric fine particles nearly identical in average particle size but different in specific gravity are used as the material and the dielectric layer is composed of the plural kinds of dielectric fine particles). As a consequence, the productivity of a dielectric device having a dielectric layer of good characteristics improves.

A dielectric device of such a configuration is preferably applied to the aforementioned electron emitter. That is, the dielectric layer can be used as the emitter of the electron emitter. In other words, in the configuration of the aforementioned electron emitter, metal is mixed with the emitter, more specifically, for example, the metal in the form of fine particles and/or films is mixed in a state of dispersing in the emitter (in a dispersed state so as to exist discontinuously), or metallic fine particles or the like can be dispersed between the dielectric particles and a prescribed substrate supporting the emitter at the interface between the emitter and the substrate.

By the above configuration, the voids in the emitter are filled with the metal while keeping the characteristics (insulativity or semi-conductivity) of the emitter as a dielectric layer and thereby the dielectric constant at the emitter improves and thus good electron emission properties can be obtained.

Mixing the metal with the dielectric layer which comprises the emitter may be performed simultaneously with forming the dielectric layer. For example, mixing the metal with the dielectric layer may be performed with spraying the dielectric particles and metallic particles on the prescribed substrate at the time of forming the dielectric layer by the aerosol deposition method.

Instead of this, mixing the metal with the dielectric layer may be performed after forming the dielectric layer. For example, mixing the metal with the dielectric layer may be performed in such manner: forming the second electrode comprised of metal on the prescribed substrate, forming the dielectric layer on the second electrode formed on the prescribed substrate, thereafter applying a kind of process such as heat treatment.

It is preferable that silver is contained within the metal which is mixed with the dielectric layer which comprises the emitter. In this case, it is also preferable that the second electrode is comprised of an electrode which contains silver (for example, a silver electrode, an electrode of silver-palladium alloy).

A feature of the present invention is that an electron emitter is comprised of not only the aforementioned emitter, the first electrode, the second electrode, but also a substrate which supports the second electrode and/or the emitter; wherein the substrate is comprised of a material which upper allowable temperature limit is low (in the explanations below, the substrate is described as "the low thermostability substrate"), the emitter is comprised of polycrystalline substance, and the distribution of the grain sizes of the crystal of the polycrystalline substance is that the proportion of the particles 0.5 μm or larger in size is 20% or more. The upper allowable temperature limit is, for example, strain point of glass, glass transition point or flow temperature of synthetic resin. Thereby it becomes possible to make the dielectric constant of the emitter higher. Besides, it is preferable that the emitter is comprised of the polycrystalline substance which distribution of the grain sizes of the crystal is that the proportion of the particles 1 μm or larger in size is 20% or more. Thereby it becomes possible to set such the surface roughness of the upper surface of the emitter as described below.

The substance which comprises the low thermostability substrate is, for example, glass or synthetic resin. In concrete terms, it is preferable to use the glass which upper allowable temperature limit is 700° C. or lower as the low thermostability substrate.

Here, it is preferable that the emitter is processed by heating process by radiating the electromagnetic wave. Thereby the heat treating process for making the dielectric structure of the emitter fine can be performed favorably, without damage to the low thermostability substrate. In concrete terms, for example, the emitter (and the portion around the interface of the second electrode and the emitter) is heated in a concentrated manner by radiating infrared ray from above the emitter with being scarcely heated the low thermostability substrate.

Besides, it is preferable, in the electron emitter according to the present invention, the first electrode is disposed on or above the upper surface of the emitter and the surface roughness of the upper surface of the emitter is in the range from 0.1 (μm) to 3 (μm) in terms of arithmetical mean deviation of profile (Ra) (hereunder an arithmetical mean deviation of profile is abbreviated as Ra and the unit μm is omitted).

More specifically, the amount of the emitted electrons increases more than ever: by setting at Ra 0.1 or more the surface roughness of the upper surface of the emitter that is supplied with electrons from the first electrode due to the application of a prescribed drive voltage and causes electron emission and thereby increasing the surface area of the emitter contributing to the electron emission; or, as described later, by forming a gap or an overhang between the lower surface of the first electrode and the upper surface of the emitter at the edge of the first electrode and thereby causing the electric field concentration to easily appear at the edge of the first electrode.

Further, by setting the surface roughness of the upper surface of the emitter at Ra 3 or less, the proportion of the bottoms of deep concavities that do not contribute to the electron emission to the upper surface of the emitter lowers and the electron emission efficiency can be increased. Here, the surface roughness of the upper surface of the emitter can be set so as to meet one of the following two ranges; (1) in the range of Ra from 0.1 to 0.5, or (2) in the range of Ra from 0.5 to 3. For example, with consideration for the adhesiveness between the first electrode and the upper surface of the emitter, the property of emission of electrons, or other factors, the roughness of the upper surface of the emitter can be set so as to meet one of the above-mentioned two ranges correspond to structural properties of the electron emitter, such as properties of the first electrode (shape, method of forming, grain size or shape of the ingredient of the first electrode, etc.), properties of the emitter (method of forming, grain size of the ingredient of the emitter, etc.).

The present invention also relates to a method of fabricating an electron emitter which is comprised of a substrate, a lower electrode formed on or above the substrate, an emitter comprised of a dielectric layer formed on or above the lower electrode, and an upper electrode formed on or above the emitter. The lower electrode corresponds to the above-mentioned second electrode. The upper electrode corresponds to the above-mentioned first electrode.

The method of fabrication in the present invention is comprised of steps mentioned below: forming a lower electrode on or above a substrate comprised of a material which upper allowable temperature limit is low (the low thermostability substrate mentioned above), forming an emitter comprised of a dielectric layer on or above the lower electrode by the aerosol deposition method, and forming an upper electrode on or above the emitter.

It is preferable that a process of heating the emitter by radiating the electromagnetic wave is included in the method of the present invention. Thereby the heat treating process for making the dielectric structure of the emitter fine can be performed favorably, without damage to the low thermostability substrate. In concrete terms, for example, the emitter (and the portion around the interface of the lower electrode and the emitter) is heated in a concentrated manner by radiating infrared ray from above the emitter with being scarcely heated the low thermostability substrate.

It is also preferable that the process of forming an emitter is comprised of a process of forming a dielectric layer on or above the lower electrode by the aerosol deposition method. By the aerosol deposition method, an emitter including a dielectric layer having scarce voids and a high packing density can be obtained. Hence, it becomes possible to form the emitter which has sufficient dielectric properties by only applying a heat treating process under the condition of relatively low temperature of 700° C. or 600° C. or lower. Thus, it becomes possible to make the dielectric layer which comprises the emitter dense favorably.

It is also preferable that the method of fabrication in the present invention further contains a process of mixing the metal component with the dielectric layer. Thereby it becomes possible to increase the dielectric constant of the dielectric layer which comprises the emitter dense easily.

It is also preferable that the process of forming the lower electrode includes forming a layer of electrode which contains a metal component. Thereby the affinity of the emitter and the lower electrode becomes better and the bonding strength between the emitter and the lower electrode becomes higher, in case that the emitter contains the metal component. Additionally, the metal component (e.g. silver) may invade the emitter from the lower electrode by diffusion at the heat treating process for making the dielectric structure of the emitter fine, especially at the process of radiating the electromagnetic wave. Hence, it becomes possible to mix the metal component with the emitter by using more simplified process.

The process of mixing the metal component with the dielectric layer which comprises the emitter may be included in the process of forming the emitter. For example, mixing the metal with the dielectric layer may be performed with spraying the dielectric particles and metallic particles on the prescribed substrate at the time of forming the dielectric layer by the aerosol deposition method.

As explained above, an electron emitter according to the present invention makes it possible to easily obtain a high electric field concentration and moreover to increase the number of the electric field concentrated portions. Thereby it becomes possible to provide an electron emitter capable of increasing the amount of emitted electrons.

BRIEF DESCRIPTION OF THE DRAWINGS

FIG. 14 is a plan view of the upper surface of the emitter by the scanning electron microscope;

FIG. 26 is a sectional view showing an example of a conventional electron emitter, excluding some portions.

DETAILED DESCRIPTION OF THE PREFERRED EMBODIMENTS

Preferred embodiments of a dielectric device according to the present invention are hereunder explained referring to drawings. The present embodiments show examples wherein a dielectric device according to the present invention is applied to an electron emission device used as an electron beam source in various devices, using electron beams, such as a display including an FED, an electron beam irradiation device, a light source, an alternative of an LED, electronic parts manufacturing apparatus, and an electronic circuit part.

Figure 1:
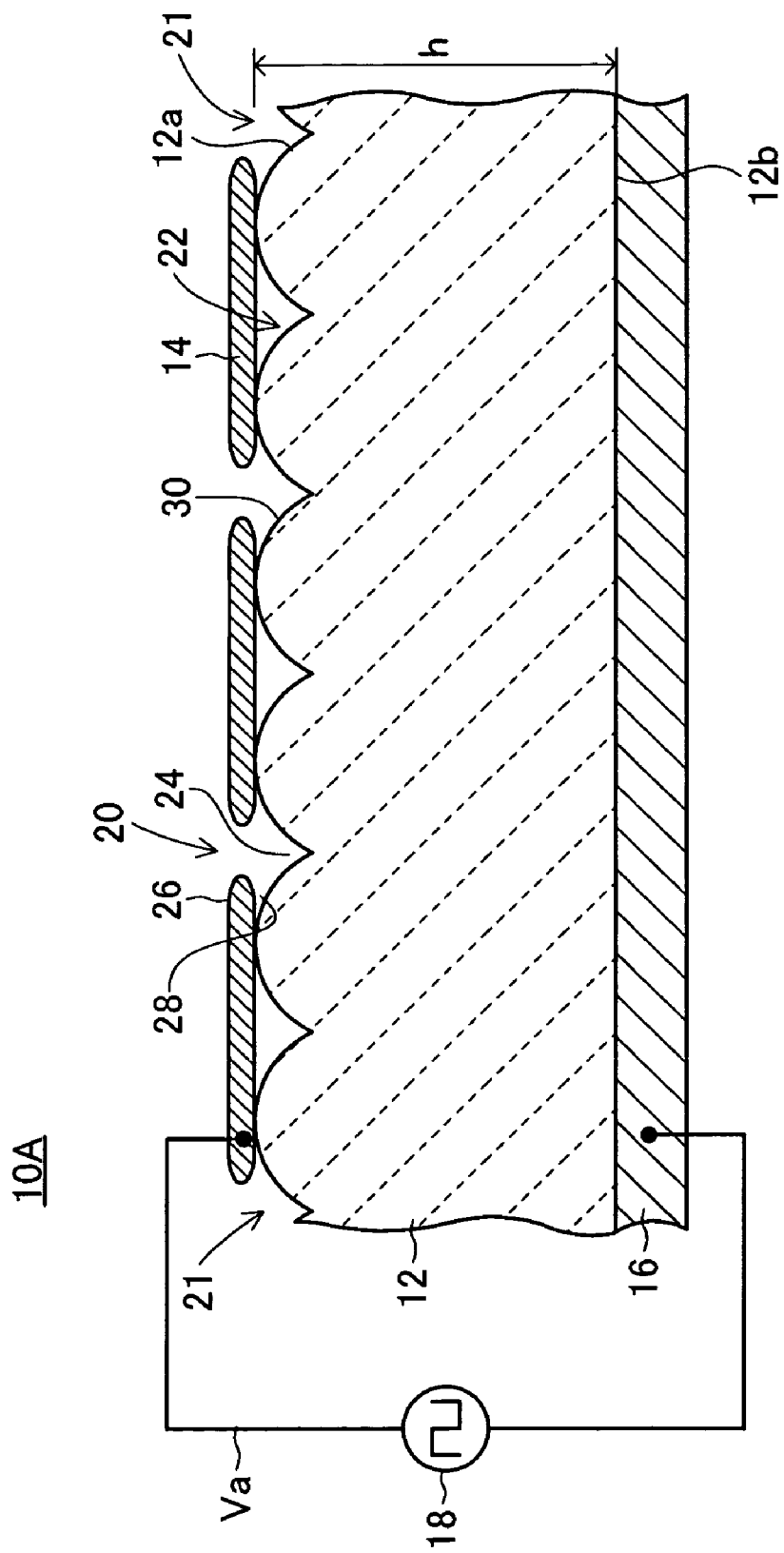
FIG. 1 is a sectional view showing an electron emitter, excluding some portions, according to the first embodiment.

Firstly, an electron emitter as a dielectric device according to the first embodiment is explained on the basis of FIGS. 1 to 10. FIG. 1 is an enlarged sectional side view of an electron emitter 10A according to the present embodiment. The electron emitters 10A are two-dimensionally formed in large numbers on a glass substrate 11 and one of them is shown in FIG. 1. The electron emitter 10A is provided with: a tabular emitter 12; an upper electrode 14 as a first electrode formed on or above the upper surface 12a of the emitter 12 and equipped with openings 20; and a lower electrode 16 as a second electrode formed on the glass substrate 11 and disposed so as to have contact with the lower surface 12b as the second surface of the emitter 12.

The emitter 12 is composed of a dielectric polycrystalline material and the thickness thereof is determined in relation to a drive voltage so that the polarization of the emitter 12 is reversed and a field intensity is applied up to the extent of not causing the dielectric breakdown when a drive voltage is applied between the upper electrode 14 and the lower electrode 16. For example, assuming that the dielectric breakdown voltage of the emitter 12 is 10 kV/mm or more, when an applied drive voltage is 100 V, the necessary thickness of the emitter 12 is 10 μm or more theoretically, but it is preferable to set the thickness of the emitter 12 at about 20 μm in consideration of the allowance enough to avoid the dielectric breakdown.

Figure 2:
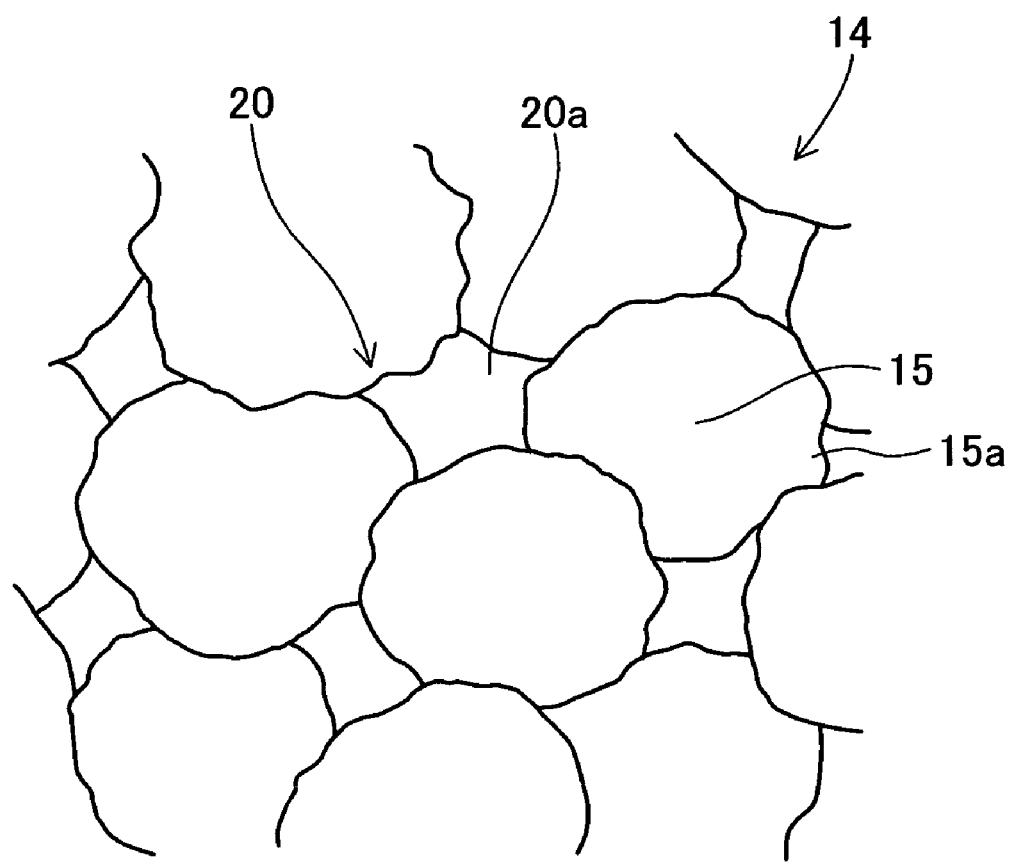
FIG. 2 is a plan view showing an example of the shape of an opening formed at an upper electrode.

The upper electrode 14 is formed so that the thickness thereof is in the range from 3 to 20 μm and has plural openings 20 through which the upper surface 12a of the emitter 12 is exposed to the exterior. As shown in FIG. 2, the upper electrode 14 is composed of many conductive particles 15 (for example graphite) of a scale-like shape. That is, the upper electrode 14 is formed so that the many conductive particles 15 are disposed in a "lying" state wherein the longitudinal direction of the conductive particles 15 is along the upper surface 12a of the emitter 12 in a sectional side view. More specifically, the conductive particles 15 are disposed on the upper surface 12a of the emitter 12 so that the angle between the longitudinal direction of the conductive particles 15 and the upper surface 12a (a virtual smooth plane obtained by averaging the unevenness caused by crystal grain boundaries and others) of the emitter 12 is 30 degrees or less in a sectional side view. In the present embodiment, the conductive particles 15 are comprised of the particle which size of the primary particle (the longest length thereof in the longitudinal direction in a sectional side view) is larger than the particle size of the dielectric composing the emitter 12.

As it is obvious from FIGS. 1 and 2, the many conductive particles 15 composing one upper electrode 14 maintain the conductivity by overlapping each other. Then the openings 20 are formed by the outer edges 15a of the many conductive particles 15 in a plan view. In other words, the apertures 20a of the openings 20 are the spaces surrounded by the outer edges 15a of the plural conductive particles 15.

The lower electrode 16 is composed of a metal thin film and a desirable thickness thereof is 20 μm or less, more desirably 5 μm or less. Then, a pulse generator 18 to apply drive voltage Va between the upper electrode 14 and the lower electrode 16 is connected to the upper electrode 14 and the lower electrode 16.

The electron emitter 10A is actuated in a prescribed vacuum atmosphere and, for example, a desirable vacuum level in the atmosphere (in particular the space above the upper surface 12a of the emitter 12 in FIG. 1) is in the range from $10^2$ to $10^{-6}$ Pa, more desirably $10^{-3}$ to $10^{-5}$ Pa. Then the electron emitter 10A is configured so as to accumulate the electrons supplied from the upper electrode 14 on the upper surface 12a of the emitter 12 corresponding to the openings 20 and thereafter emit the electrons accumulated on the upper surface 12a to the outer atmosphere (the upper side in FIG. 1) through the openings 20.

Further, since the emitter 12 is composed of a polycrystalline material as stated above, microscopic unevenness are formed by the crystal grain boundaries and others on the upper surface 12a of the emitter 12 and concavities 24 are formed on the upper surface 12a of the emitter 12. Then the openings 20 of the upper electrode 14 are formed at the portions corresponding to the concavities 24. FIG. 1 shows an example of the case where one opening 20 is formed for one concavity 24, but there are some cases where one opening 20 is formed for plural concavities 24.

Figure 3:
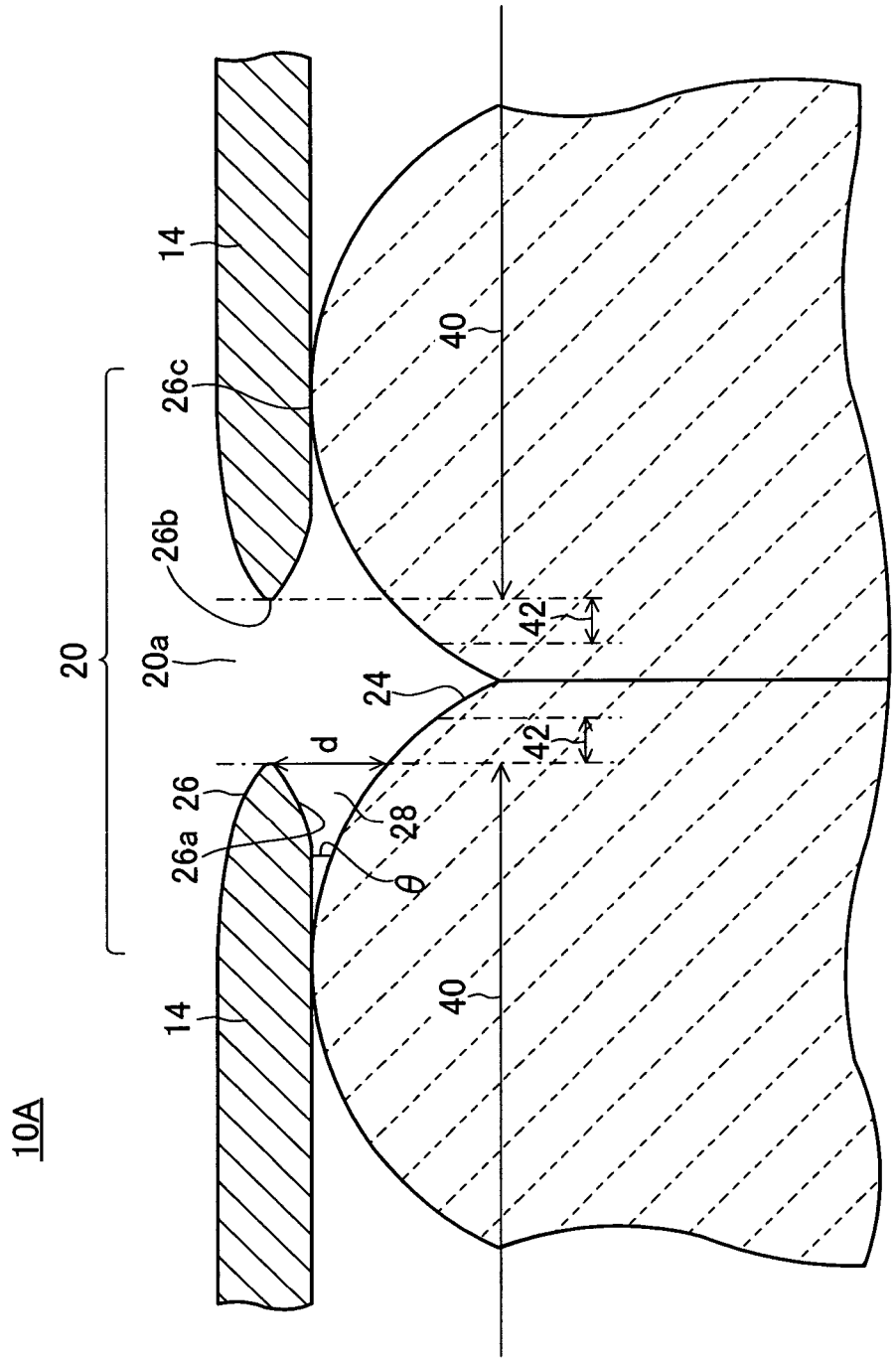
FIG. 3 is an enlarged sectional view showing the main part of the above electron emitter.

Further, as shown in FIG. 3, an opening 20 is composed of the aperture 20a surrounded by the inner edge of the opening 20 and the periphery 26 which is the surroundings of the aperture 20a. Then in the upper electrode 14, the face 26a, of the periphery 26 of the opening 20, opposite to the emitter 12 is isolated from the emitter 12. In other words, in the upper electrode 14, a gap 28 is formed between the face 26a, of the periphery 26 of the opening 20, opposite to the emitter 12 and the emitter 12, and the periphery 26 of the opening 20 in the upper electrode 14 is formed into the shape of an overhang (hence in the explanations below, the term "the periphery 26 of the opening 20 in the upper electrode 14" is described as "the overhang 26 of the upper electrode 14," and the term "the face 26a, of the periphery 26 of the opening 20 in the upper electrode 14, opposite to the emitter 12" is described as "the lower face 26a of the overhang 26 in the upper electrode 14"). Then as it is obvious from FIGS. 2 and 3, the overhang 26 is composed of the edges 15a of the plural conductive particles 15.

Here, in the present embodiment, the maximum angle θ between the upper surface 12a (the face in the vicinity of the top of the convex portion of a jog) of the emitter 12 and the lower face 26a of the overhang 26 in the upper electrode 14 is set so as to satisfy the expression $1° \leq \theta \leq 60°$.

Further, the maximum distance d in the vertical direction between the upper surface 12a of the emitter 12 and the lower face 26a of the overhang 26 in the upper electrode 14 is set so as to satisfy the expression $0\ \mu m < d \leq 10\ \mu m$ and the surface roughness of the upper surface 12a is controlled in the range from 0.1 to 3 in Ra.

Then a triple junction (a triple point where an upper electrode 14, an emitter 12, and vacuum have contact with each other) 26c is formed at a portion where the upper surface of the emitter 12, the upper electrode 14 and the medium surrounding the electron emitter 10A (for example vacuum) contact. Then the triple junction 26c is the place (electric field concentrated portion) where the lines of electric force concentrate (electric force concentration) when drive voltage Va is applied between the upper electrode 14 and the lower electrode 16. Here, "the place where the lines of electric force concentrate" means the place where the lines of electric force originated from the lower electrode 16 at equal intervals concentrate when the lines of electric force are drawn assuming that the upper electrode 14, the emitter 12 and the lower electrode 16 are the flat plates extending infinitely in a sectional side view. The state of the accumulation of the lines of electric force (electric force concentration) can easily be simulated by the numerical analysis using the finite element method.

Further, in the present embodiment, the opening 20 is formed so that the inner edge 26b of the opening 20 serves as an electric field concentrated portion. More specifically, the overhang 26 of the opening 20 is formed so as to sharply protrude at an acute angle toward the inner edge 26b which is the tip of the overhang 26 (so as to reduce the thickness gradually) in a sectional side view. The upper electrode 14 having an opening 20 of such a shape can be formed by a simple method, namely, as stated above, by disposing the conductive particles 15 having a shape extending in the longitudinal direction in a sectional side view in the state of "lying" so that the longitudinal direction of the conductive particles 15 is along the upper surface 12a of the emitter 12 in a sectional side view. Note that, the electric field concentrated portion at the inner edge 26b of the opening 20 and the triple junction 26c as stated above are also formed at positions corresponding to the outer edges 21 at the outer periphery of the upper electrode 14 (refer to FIG. 1).

Here, each of the openings 20 is formed so that it has the aperture 20a the diameter of which, the diameter being represented by the diameter of a virtual circle having the same area as the aperture 20a in a plan view, is in the range from 3 μm to 20 μm in average. The reasons are as follows.

As shown in FIG. 3, the portions, of the emitter 12, where polarization is reversed or changed in accordance with the drive voltage Va applied between the upper electrode 14 and the lower electrode 16 (refer to FIG. 1) are the portions immediately under the portions (first portions) 40 where the upper electrode 14 is formed and the portions (second portions) 42 corresponding to the regions from the inner edge (inner periphery) of the opening 20 toward the inner direction of the opening 20. In particular, the region of electron emission at the second portions 42 varies in accordance with the level of the drive voltage Va and the degree of the electric field concentration at the portions. Then when the average diameter of the aperture 20a is within the range from 3 μm to 20 μm in the present embodiment, a sufficient amount of electrons emitted at the opening 20 can be secured and electrons can be emitted efficiently. In other words, when the average diameter of the aperture 20a is less than 3 μm, the area of the second portions 42 which is the main region contributing to the accumulation and emission of electrons supplied from the upper electrode 14 becomes small and thus the amount of the emitted electrons decreases. In contrast, when the average diameter of the aperture 20a exceeds 20 μm, the proportion (share) of the area of the second portions 42 to the area of the portion, of the emitter 12, exposed through the opening 20 decreases and thus the efficiency of the electron emission lowers.

Figure 4:
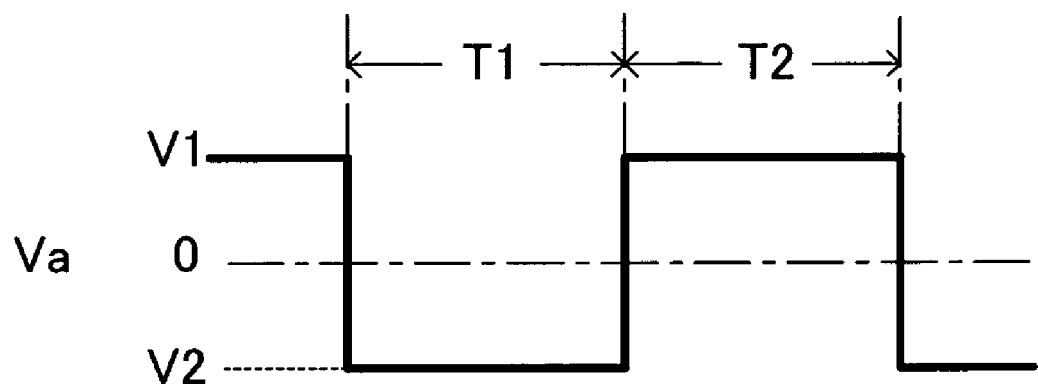
FIG. 4 is a diagram showing a voltage wave form of drive voltage applied to the above electron emitter.

Next, the principle of electron emission in an electron emitter 10A is explained on the basis of FIGS. 4 to 6. In the present embodiment, as shown in FIG. 4, the drive voltage Va applied between the upper electrode 14 and the lower electrode 16 takes the shape of a rectangular wave the cycle of which is T1+T2 so that, with the reference voltage being 0 V, at the first step of the duration T1, the drive voltage is V2 which means that the potential of the upper electrode 14 is lower than that of the lower electrode 16 (negative voltage) and, at the succeeding second step of the duration T2, the drive voltage is V1 which means that the potential of the upper electrode 14 is higher than that of the lower electrode 16 (positive voltage).

Figure 5A:
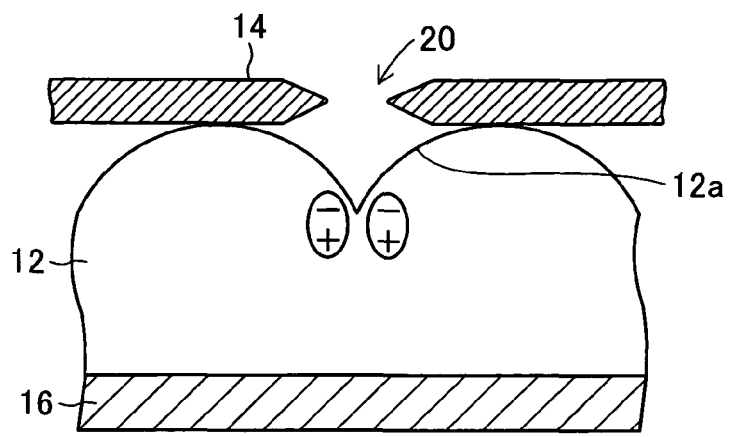
FIG. 5A to 5C include explanatory views showing the aspect of the behavior of the above electron emitter.

The principle is further explained on the assumption that, in the initial state, the emitter 12 is polarized in one direction and for example the negative pole of a dipole is in the state of being directed to the upper surface 12a of the emitter 12 (refer to FIG. 5A).

Firstly, in the initial state wherein the reference voltage is applied, as shown in FIG. 5A, since the negative pole of a dipole is in the state of being directed to the upper surface 12a of the emitter 12, electrons are in the state of scarcely accumulated at the upper surface 12a of the emitter 12.

Figure 5B:
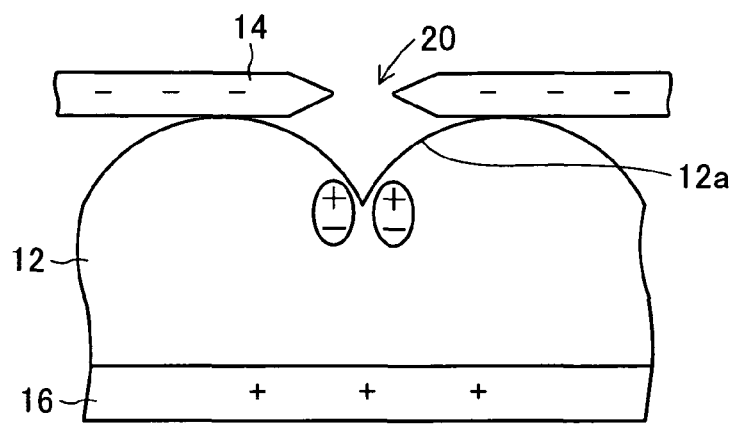

Thereafter, when the negative voltage V2 is applied, the polarization is reversed (refer to FIG. 5B). By the polarization reversal, electric field concentration is caused at the inner edge 26b and the triple junction 26c serving as the electric field concentrated portions, electrons are emitted (supplied) from the electric field concentrated portions at the upper electrode 14 to the upper surface 12a of the emitter 12, and electrons are accumulated, for example, at the portion, of the upper surface 12a, exposed through the opening 20 of the upper electrode 14 and the portion in the vicinity of the overhang 26 of the upper electrode 14 (refer to FIG. 5C). That means the upper surface 12a is electrified. The electrification can last until a certain saturated state appears due to the value of electric surface resistance of the emitter 12 and the amount of the electrification can be controlled by the time during which control voltage is applied. In this way, the upper electrode 14 (the electric field concentrated portions in particular) serves as the supply source of electrons to the emitter 12 (the upper surface 12a).

Figure 6A:
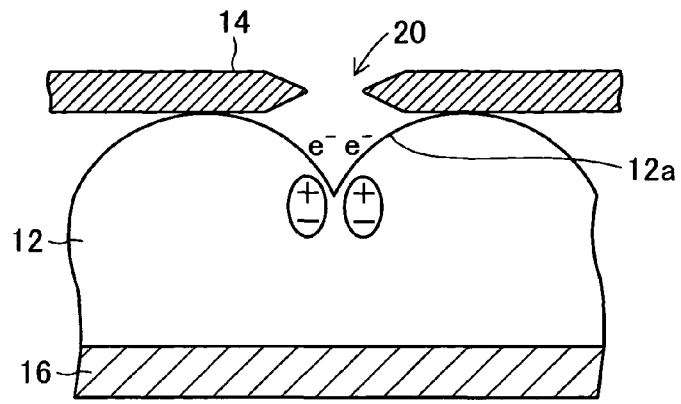
FIG. 6A to 6C include other explanatory views showing the aspect of the behavior of the above electron emitter.
Figure 6B:
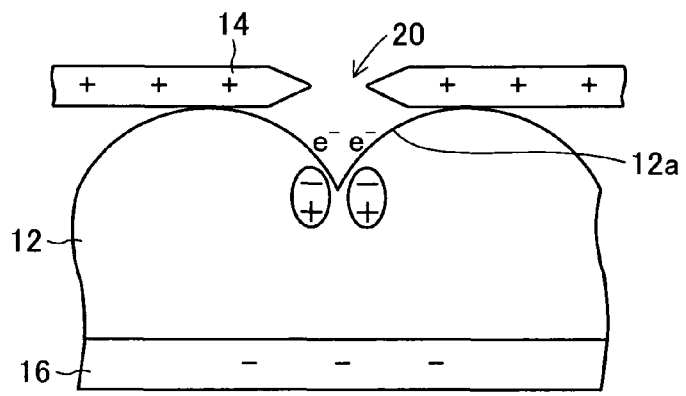
Figure 6C:
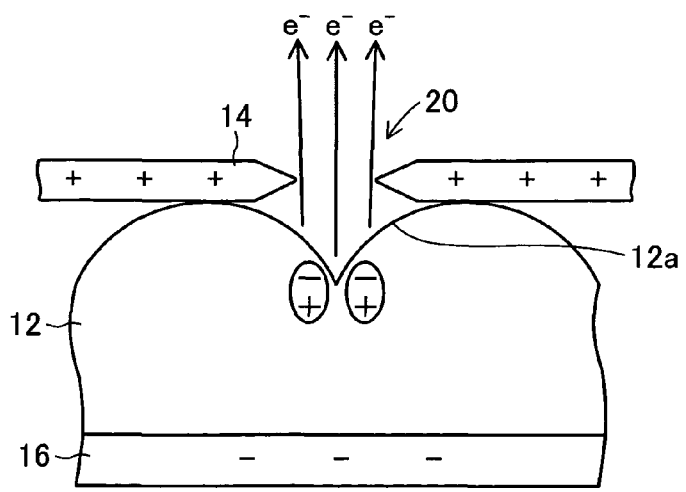

Thereafter, when the negative voltage V2 returns to the reference voltage again as shown in FIG. 6A and then positive voltage V1 is applied, the polarization is reversed again (refer to FIG. 6B) and the electrons accumulated on the upper surface 12a are emitted outside through the aperture 20a by the coulomb repulsive force caused by the negative pole of the dipole (refer to FIG. 6C).

Here, also at the outer edge of the outer periphery, of the upper electrode 14, where no opening 20 is formed, electrons are discharged in the same way as described above.

Figure 7:
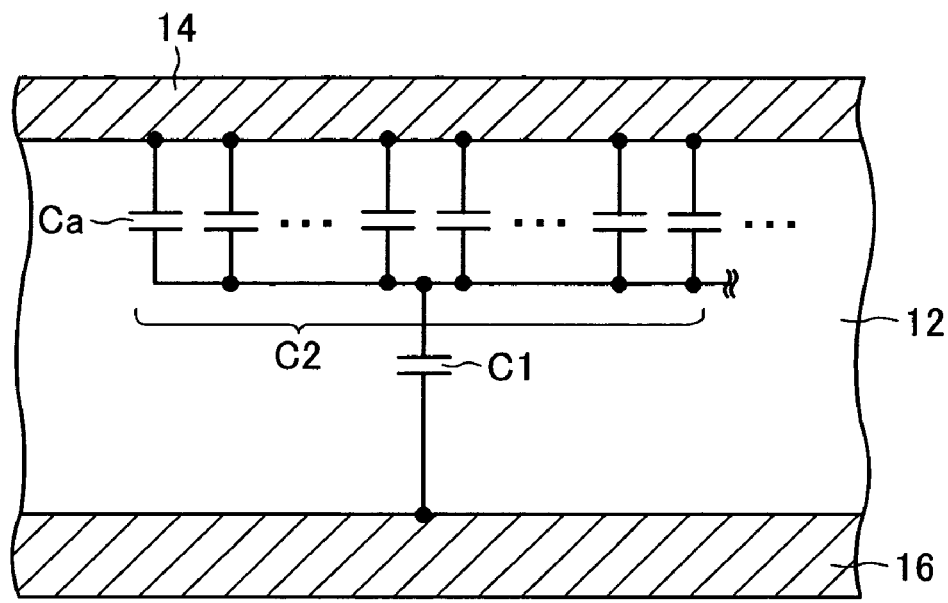
FIG. 7 is an equivalent circuit diagram explaining the influence of forming gaps between an upper electrode and an emitter on the electric field between the upper electrode and a lower electrode.

Further, in the present embodiment, as shown in FIG. 7, in an electrical behavior, a condenser C1 caused by the emitter 12 and an integrated condenser including plural condensers Ca caused by the gaps 28 are formed between the upper electrode 14 and the lower electrode 16. That is, the plural condensers Ca caused by the gaps 28 are integrated as one condenser C2 formed by connecting each other in parallel and, in terms of an equivalent circuit, that takes the form of serially connecting the condenser C1 caused by the emitter 12 to the integrated condenser C2.

In actual operation, the condenser C1 caused by the emitter 12 is not serially connected to the integrated condenser C2 as it is and the components of the serially connected condensers vary in accordance with the number of the formed openings 20 of the upper electrode 14, the overall formed area and others.

Figure 8:
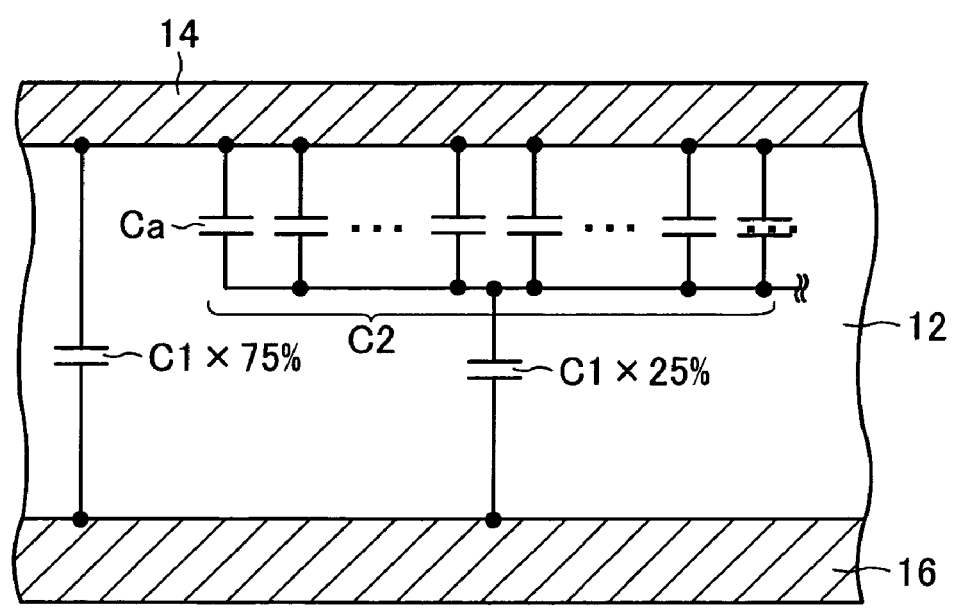
FIG. 8 is another equivalent circuit diagram explaining the influence of forming gaps between the upper electrode and the emitter on the electric field between the upper electrode and the lower electrode.

Here, as shown in FIG. 8, it is attempted to calculate the capacitance on the assumption that for example 25% of the condenser C1 caused by the emitter 12 is serially connected to the integrated condenser C2. Firstly, the relative dielectric constant is one since the portions of the gaps 28 are vacuum. Then the maximum length d of the gaps 28 is set at 3 µm, the area S of the portion of one gap 28 is set at 1 µm×1 µm, and the number of the gaps 28 is set at 10,000 pieces. Further, setting the relative dielectric constant of the emitter 12 at 2,000, the thickness of the emitter 12 at 20 µm, and the area of the opposing faces of the upper electrode 14 and the lower electrode 16 at 200 µm×200 µm, the capacitance of the integrated condenser C2 is 0.885 pF and the capacitance of the condenser C1 caused by the emitter 12 is 35.4 pF. Then, when the part, of the condenser C1 caused by the emitter 12, serially connected to the integrated condenser C2, is assumed to be 25% of the total, the capacitance of the portion connected in series (the capacitance including the capacitance of the integrated condenser C2) is 0.805 pF and the remaining capacitance is 26.6 pF.

Since the portion connected in series and the remaining portion are connected to each other in parallel, the overall capacitance is 27.5 pF. The capacitance corresponds to 78% of the capacitance 35.4 pF of the condenser C1 caused by the emitter 12. It means that the overall capacitance is smaller than the capacitance of the condenser C1 caused by the emitter 12.

In this way, with regard to the integrated capacitance of the condensers Ca caused by the plural gaps 28, the capacitance of the condensers Ca caused by the gaps 28 is relatively small and thus most part of the applied voltage Va is applied to the gaps 28 and a high output of electron emission can be secured at the gaps 28 on account of the voltage divided from the condenser C1 caused by the emitter 12.

Further, since the integrated condenser C2 is serially connected to the condenser C1 caused by the emitter 12, the overall capacitance is smaller than the capacitance of the condenser C1 caused by the emitter 12. As a result, preferable effects such as a high electron emission output and a low overall electric power consumption can be obtained.

EXAMPLE 1

Figure 9:
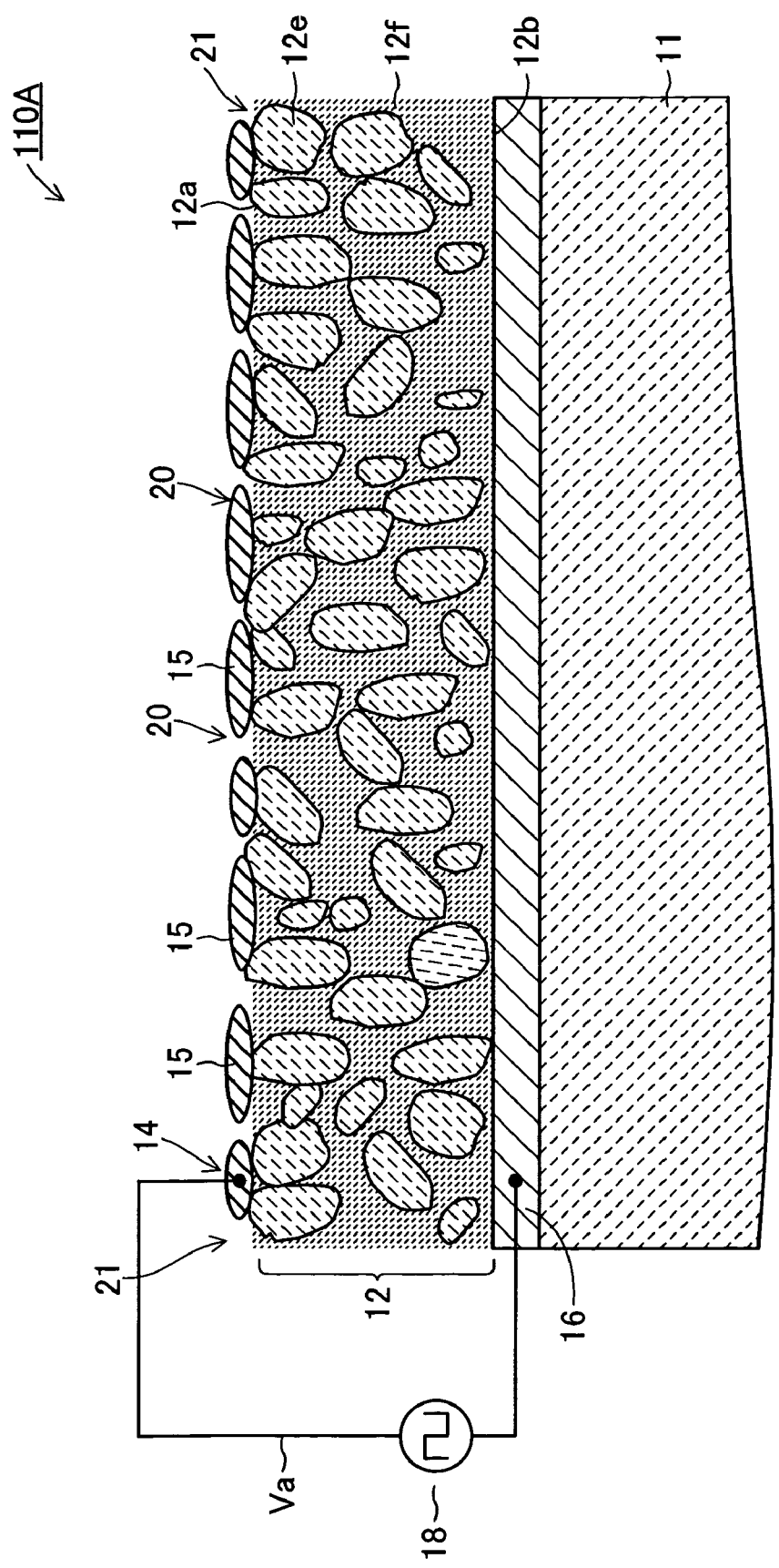
FIG. 9 is a sectional view showing an electron emitter according to the first embodiment.

Here, a preferable example of an electron emitter according to the present invention is explained on the basis of FIG. 9. In the electron emitter 110A of the first example, the emitter 12 includes many first dielectric particles 12e and second dielectric particles 12f. The first dielectric particles 12e are relatively coarse particles the size of which is 1 µm or larger and the second dielectric particles 12f are made of the same material as the first dielectric particles 12e and are fine particles having sizes of submicron level. Then the second dielectric particles 12f are disposed so as to fill the spaces surrounded by the many first dielectric particles 12e.

Here, since the upper surface 12a of the emitter 12 serves to emit electrons by applying a prescribed electric field, if there are particles of too small size s, defects such as crystal grain boundaries increase and the relative dielectric constant lowers and consequently the applied field intensity undesirably lowers. Hence, it is preferable that the number of coarse particles having the sizes of micron level is as large as possible. For that reason, in a distribution of the sizes of the dielectric particles composing the emitter 12 (including the first dielectric particles 12e and the second dielectric particles 12f), it is desirable that the proportion of the particles 1 µm or larger in size is 30% or more, more desirably 50% or more, or still more desirably the proportion of the particles 2 µm or larger in size is 50% or more. Here, the above particle sizes and proportions are the values calculated by subjecting a section to image analysis and, for example, the particle size of each particle is determined by regarding the diameter of a circle which has the same area as the relevant-particle as the particle size and the proportion is determined as the value obtained by calculating the distribution of the particle sizes through the area standard.

Further, as stated above, since the emitter 12 is a polycrystalline material composed of the many first dielectric particles 12e and second dielectric particles 12f, microscopic unevenness caused by the junction among the adjacent first dielectric particles 12e and crystal grain boundaries are formed on the upper surface 12a of the emitter 12.

As stated above, in the present example, the emitter 12 includes the comparatively coarse first dielectric particles 12e of micron level and the second dielectric fine particles 12f of a submicron level and the second dielectric particles 12f is disposed so as to fill the spaces surrounded by the many first dielectric particles 12e. Then, by properly adjusting the degree of filling the spaces surrounded by the many first dielectric particles 12e with the second dielectric particles 12f, it becomes possible to set properly and easily the physical and electrical properties required for the emitter 12. In particular, it is possible to easily form the upper surface 12a so as to have such surface roughness as stated above. Further, microscopic unevenness are formed on the upper surface 12a of the emitter 12 by the junction of the adjacent plural dielectric particles 12e and 12f and crystal grain boundaries and, by utilizing the microscopic unevenness, such overhanging shapes as the aforementioned overhang 26 are easily formed. In particular, merely by arranging the conductive particles 15 having a shape extending in the longitudinal direction in a sectional side view on the upper surface 12a of the emitter 12, the aforementioned overhangs 26 are formed easily and abundantly. Here, in this case, considering that the average particle size of the first dielectric particles 12e in the emitter 12 is around 1 to 2 μm as stated above, a preferable size of the primary particles of the conductive particles 15 is about 3 μm or larger. Further, since the second dielectric particles 12f are made of the same material as the first dielectric particles 12e, the surface energy of them is identical at the portions having contact with each other and hence the first dielectric particles 12e and the second dielectric particles 12f go well with each other at the contact portions and thus it becomes easy to increase the packing density of the dielectric material in the emitter 12.

In particular, by forming the emitter 12 by the aerosol deposition method or the sol impregnation method, a dielectric thin layer having a high filling factor and a high dielectric constant but scarce defects can be obtained through a process of a relatively low temperature. Hence, it is possible to form an electron emitter 10A on a substrate of a relatively low heat resistance and a low cost, such as a glass substrate (for example, CP600V (commercial name) manufactured by Central Glass Co., Ltd., strain point: 583° C.) or the like, and to realize the upsizing of the screen and the cost reduction of an FED. Further, it is possible to arbitrarily adjust the physical properties (surface roughness and others) of the emitter 12 by properly selecting the film forming conditions of the aerosol deposition method or the sol impregnation method. Here, by applying heat treatment at 500° C. or lower when the upper electrode 14 is formed, the dielectric constant of the emitter 12 further increases and the electron emission capability improves.

EXAMPLE 2

Figure 10:
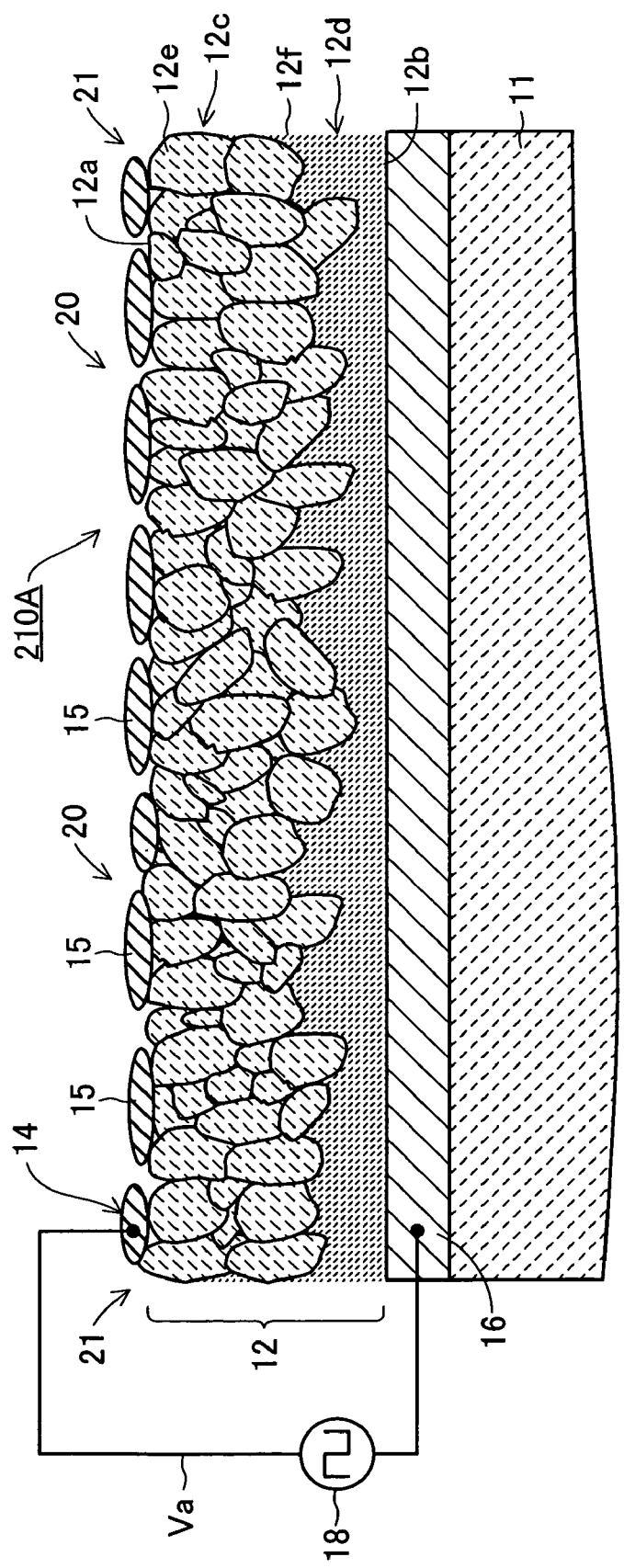
FIG. 10 is a sectional view showing an electron emitter according to the second embodiment.

Further, an electron emitter 210A according to the second preferable example is explained referring to FIG. 10. In the electron emitter 210A according to the second example, the emitter 12 has a double-layered structure including the first layer 12c composing the uppermost layer of the emitter 12 and the second layer 12d located under the first layer 12c and formed on the lower electrode 16. Then the upper surface of the first layer 12c composes the upper surface 12a of the emitter 12. Here, the first layer 12c includes a large number of the first dielectric particles 12e.

Since, as stated above, the upper surface of the first layer 12c composes the upper surface 12a of the emitter 12 that has the function of emitting electrons when a prescribed electric field is applied, in particular if the size of the first dielectric particles 12e composing the first layer 12c is too small, defects such as crystal grain boundaries and others increase, resulting in the lowering of the relative dielectric constant, thereby applied field intensity undesirably lowers, and hence it is preferable that the number of coarse particles having the sizes of micron level is as large as possible. For this reason, in a distribution of the sizes of the first dielectric particles 12e, it is desirable that the proportion of the particles 1 μm or larger in size is 30% or more, more desirably 50% or more, or still more desirably the proportion of the particles 2 μm or larger in size is 50% or more. Here, the particle sizes and proportions cited here are the values calculated by subjecting a section to image analysis and, for example, the particle size of each particle is determined by regarding the diameter of a circle which has the same area as the relevant particle as the particle size and the proportion is determined as the value obtained by calculating the distribution of the particle sizes through the area standard.

Further, the second layer 12d includes a large number of the second dielectric particles 12f having a smaller average particle size than the first dielectric particles 12e. The second layer 12d is formed on the metal-made lower electrode 16 formed beforehand on a glass substrate 11 and supports the first layer 12c thereon. That is, the second layer 12d is required to bond to not only the metal-made lower electrode 16 with a sufficient strength but also the first layer 12c firmly so as not to form defects such as cracks between itself and the first layer 12c. For that reason, it is preferable that the second dielectric particles 12f composing the second layer 12d are fine particles having the sizes of submicron level and also a narrow particle size distribution in a manner different from the first dielectric particles 12e.

Next, the method of fabricating an electron emitter 10A according to the present embodiment is explained on the basis of FIGS. 11 to 14, focusing on the forming method of the emitter 12 in particular. In this construction, the reference numerals of the elements of the above-mentioned electron emitter in the figures shown above are cited ad libitum.

Figure 11:
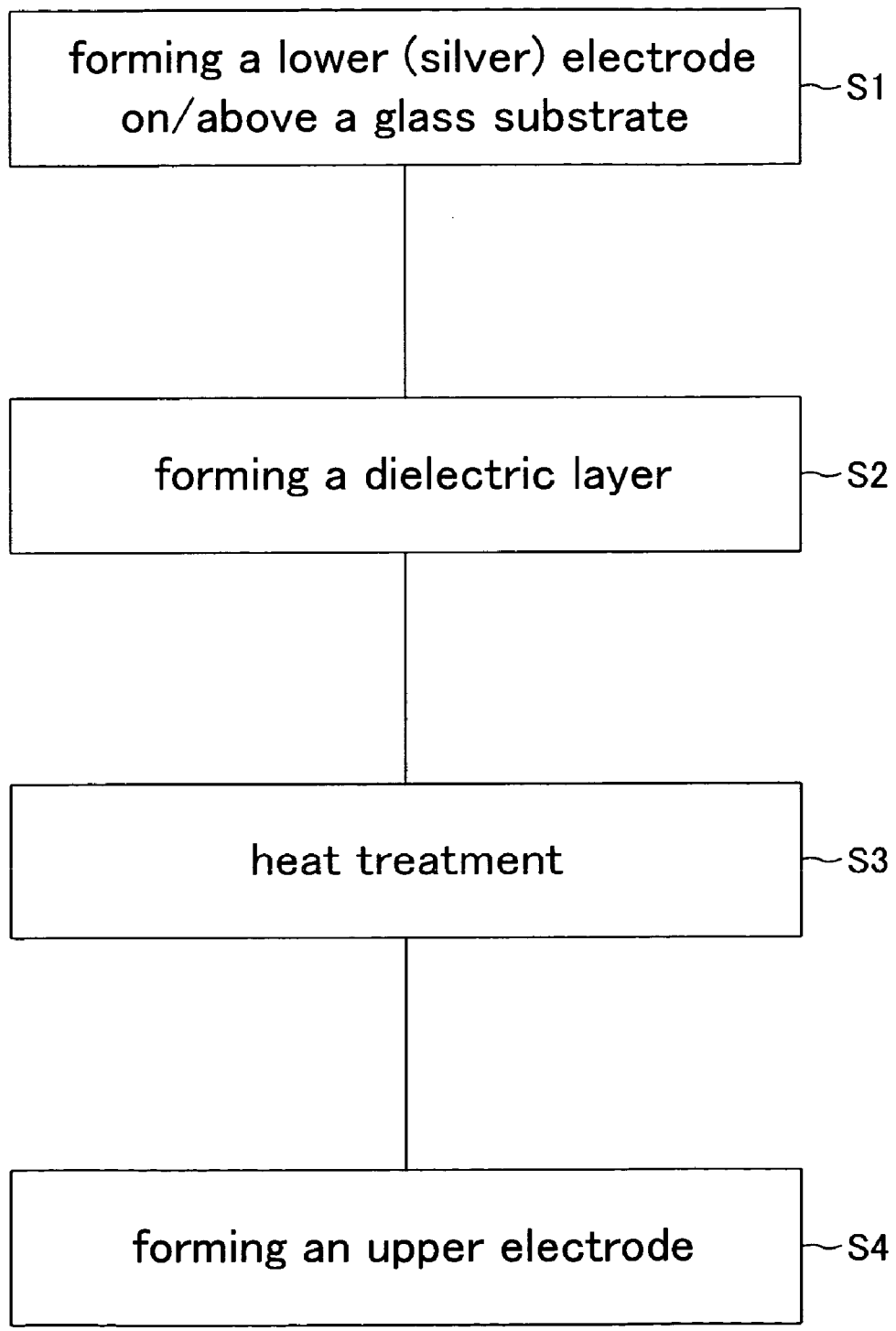
FIG. 11 is a schematic flow chart of the method of fabricating the electron emitter.

FIG. 11 is a schematic flow chart of the method of fabricating the electron emitter. As shown in FIG. 11, in this method, a step S1 (the letter "S" of "S1" is the abbreviated expression of "step": hereunder referred to simply as "S") of forming the lower electrode 16 on or above a glass substrate is performed firstly. Next, a step S2 of forming the dielectric layer on the lower electrode 16 which is formed by the process S1 is performed. Subsequently, a step S3 of processing a heat treatment to the dielectric layer which is formed by the process S2 is performed. Furthermore, a step S4 of forming the upper electrode 14 on the emitter 12 which is formed by applying the heat treatment process S3 is performed.

Figure 12:
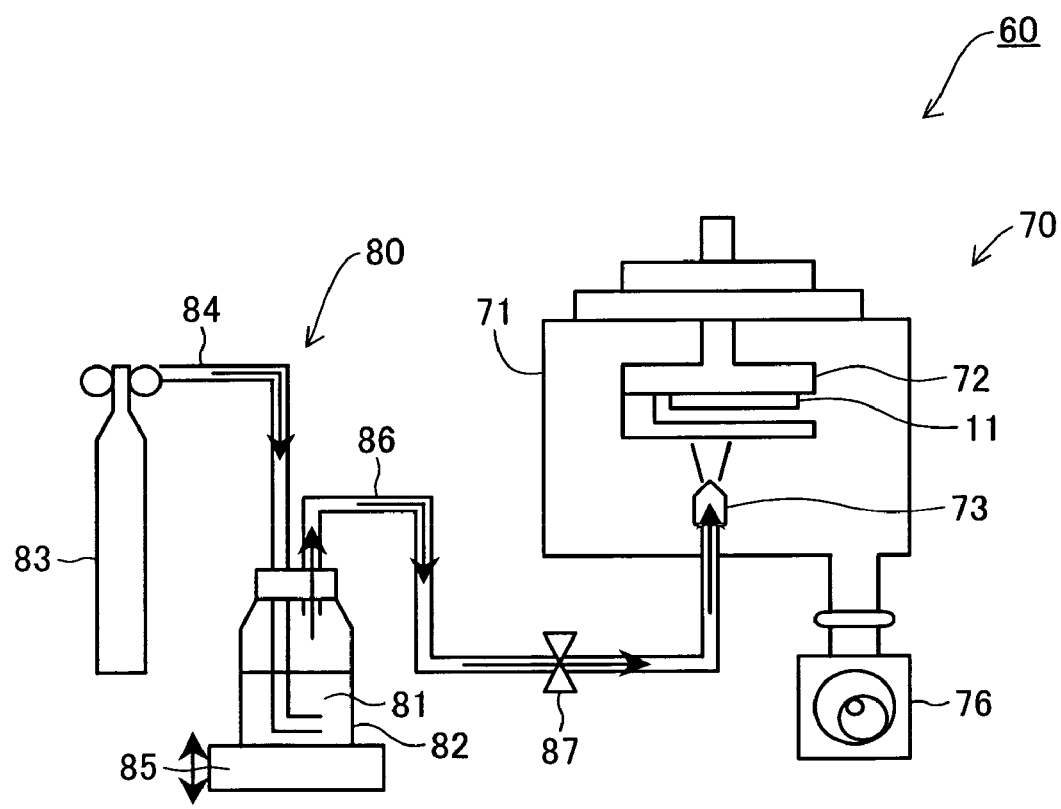
FIG. 12 is a schematic configuration diagram explaining a method of forming the emitter.

FIG. 12 is a configuration diagram showing the outline of aerosol deposition equipment in the case of forming the emitter 12, which is applicable to the process S2 forming the dielectric layer by the aerosol deposition method. By the aerosol deposition method, material powder is crushed and ground during the process of forming a film on a substrate and hence it is possible to control the surface roughness in a stable manner.

The aerosol deposition equipment 60 is provided with a film forming chamber 70 and a first aerosol feeder 80. The film forming chamber 70 is provided with: a vacuum chamber 71 the interior of which is maintained to a prescribed vacuum level; an X-Y-Z-θ stage 72 that holds a glass substrate 11 in the vacuum chamber 71 and allows the glass substrate 11 to move in an arbitrary direction; a first nozzle 73 fixed in the vacuum chamber 71 in order to spray aerosol on the glass substrate 11 held on the X-Y-Z-θ stage 72; and a vacuum pump 76 to maintain the interior of the vacuum chamber 71 to a prescribed vacuum level.

The vacuum level in the interior of the vacuum chamber 71 is set at around 50 to 1,000 Pa with the vacuum pump 76. The first nozzle 73 has an opening in the shape of a slit 10 mm×0.4 mm in size and ejects through the opening aerosol supplied from the first aerosol feeder 80 toward the glass substrate 11 in the vacuum chamber 71 having the above vacuum level. The glass substrate 11 is transferred in an arbitrary direction by the X-Y-Z-θ stage 72 and thereby, while moving relative to the first nozzle 73, aerosol is sprayed.

The first aerosol feeder 80 is provided with: a first aerosolizing chamber 82 to store material powder 81; a compressed gas supply source 83 to store a carrier gas used for mixing it with the material powder 81 and generating aerosol in the first aerosolizing chamber 82; a compressed gas feed pipe 84 to feed the carrier gas from the compressed gas supply source 83 to the first aerosolizing chamber 82; a vibration agitator 85 to impose vibration on the first aerosolizing chamber 82 in order to mix the material powder 81 with the carrier gas and aerosolize them in the first aerosolizing chamber 82; an aerosol feed pipe 86 to feed aerosol from the first aerosolizing chamber 82 to the first nozzle 73; and a control valve 87 to control the amount of aerosol ejected from the first nozzle 73 to the glass substrate 11 by adjusting the flow rate of the aerosol in the aerosol feed pipe 86.

The material powder 81 is a dielectric powder and, in the case of forming such an emitter 12 as described in the first and second examples, two kinds of dielectric powder is used; one is dielectric powder of relatively coarse particles and the other is dielectric fine powder having a smaller particle size. For example, used is the mixture of dielectric powder of relatively coarse particles 1.5 to 5 μm in average particle size (nominal value by the manufacturer; measured by laser diffractometry or with a Coulter Multisizer (a registered trademark)) and dielectric fine powder 1 μm or smaller in average particle size (nominal value by the manufacturer; the same as above). Here, in the case of forming an emitter 12 of a single layered structure other than the structure of the above examples, dielectric powder 1 μm or smaller in average particle size (nominal value by the manufacturer; the same as above) is used.

The material powder 81 is aerosolized by undergoing vibration from the vibration agitator 85 and thereby being mixed with a carrier gas violently in the first aerosolizing chamber 82. Since the aerosol behaves like a fluid, in the state of opening the control valve 87, the aerosol flows toward the vacuum chamber 71 due to the pressure difference between the first aerosolizing chamber 82 and the vacuum chamber 71 and is ejected toward the glass substrate 11 at a high speed through the first nozzle 73. Here, as the carrier gas stored in the compressed gas supply source 83, besides compressed air, an inert gas such as a nitrogen gas or a noble gas including a helium gas, an argon gas or the like can be used. Then by opening the control valve 87 and ejecting the aerosol of the material powder 81 toward the glass substrate 11, the emitter 12 is formed on the glass substrate 11 (more precisely on the lower electrode 16).

Figure 13:
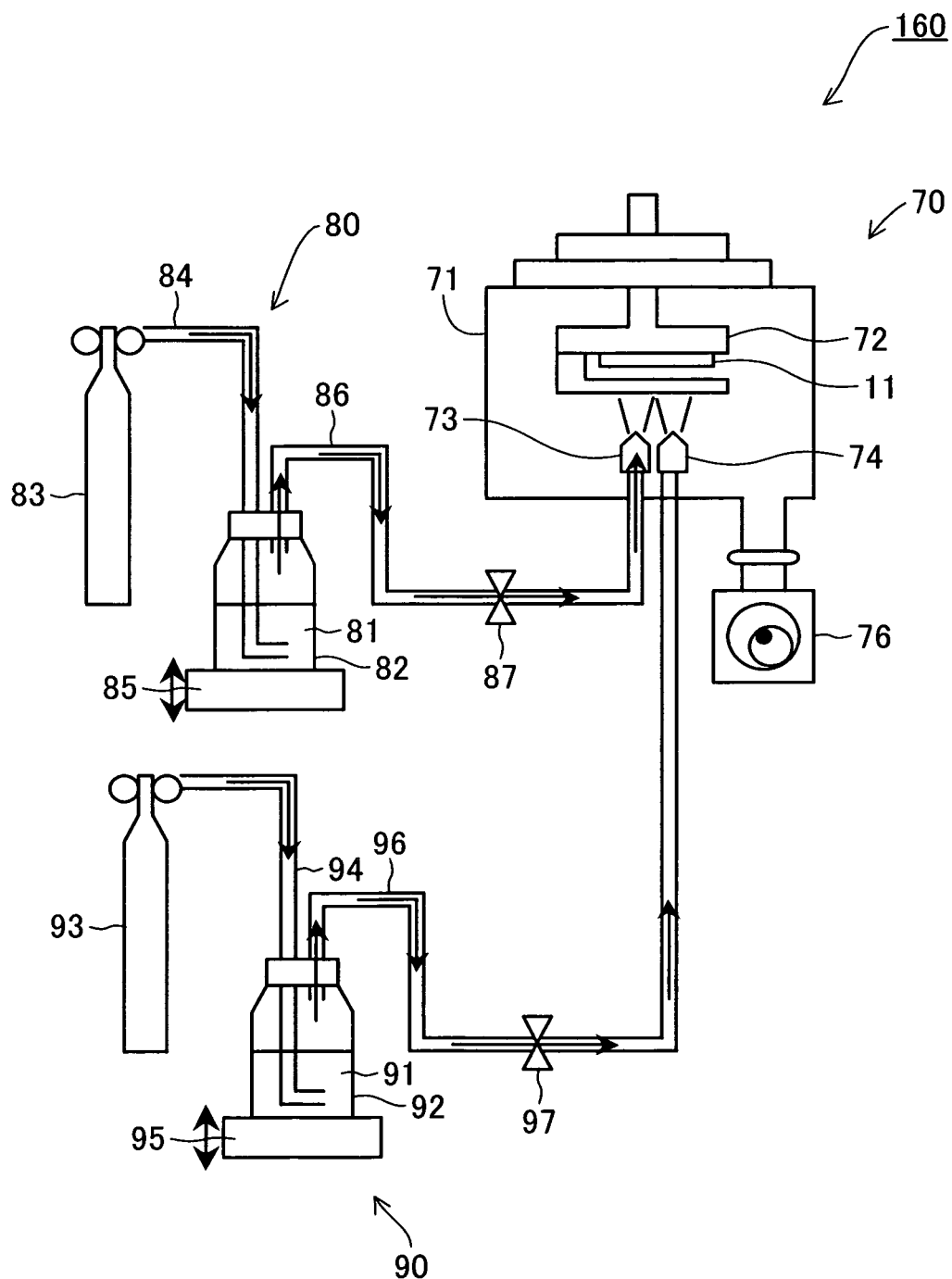
FIG. 13 is a schematic configuration diagram explaining another method of forming the emitter.

FIG. 13 is a configuration diagram showing the outline of another example of the aerosol deposition equipment in the case of forming an emitter 12 by means of the film deposition by the aerosol deposition method. Here, the constituent components having the same operations and functions as the aerosol deposition equipment 60 in FIG. 12 are marked with the same reference numerals and the explanations thereof are omitted.

The aerosol deposition equipment 160 is provided with a film forming chamber 70, a first aerosol feeder 80, and a second aerosol feeder 90. The film forming chamber 70 is provided with, besides the aforementioned first nozzle 73, a second nozzle 74 to eject aerosol supplied from the second aerosol feeder toward the glass substrate 11 in the film forming chamber 70. The first aerosol feeder 80 is the same as the case of FIG. 12 except that material powder 181 is used. The second aerosol feeder 90 also has the same construction as the first aerosol feeder 80 except that material powder 191 is used and is provided with a second aerosolizing chamber 92, a compressed gas supply source 93, a compressed gas feed pipe 94, a vibration agitator 95, an aerosol feed pipe 96, and a control valve 97. The second nozzle 74 has an opening in the shape of a slit 5 mm×0.3 mm in size.

The material powder 181 is a dielectric in the form of relatively coarse powder 1.5 to 5 μm in average particle size (nominal value by a manufacturer; the same as above) and the material powder 191 is a dielectric in the form of fine powder 1 μm or smaller in average particle size (nominal value by a manufacturer; the same as above). Then by opening the control valves 87 and 97 simultaneously or one of them arbitrarily, the emitter 12 is formed on the glass substrate 11 (more precisely on the lower electrode 16).

Note that, though situations differ in accordance with the ejection conditions of aerosol, mechanical properties of the material powder 81, 181 and 191, and the like, since those particles of the material powder 81, 181 and 191 are ejected toward the glass substrate 11 and undergo impulsive force when they collide with the glass substrate 11 and the like, the shapes of the particles of the material powder 81, 181 and 191 are generally different from the shapes of the dielectric particles composing the emitter 12 formed on the glass substrate 11 (for example, the first dielectric particles 12e and the second dielectric particles 12f).

As a consequence, the emitter 12 formed by the aerosol deposition method is formed as a very closely packed dielectric thin film of a high packing density and sufficient dielectric properties can be obtained even though sintering at 900° C. or higher is not applied. Hence it becomes possible to form a film at a low temperature of 700° C. or 600° C. or lower. Further, the upper surface 12a of the emitter 12 can also be formed into an arbitrary surface state (surface roughness) in accordance with the film forming conditions of the aerosol deposition method.

Further, the emitter 12 can be formed also by the sol impregnation method. In the case of using the sol impregnation method, firstly, a dielectric layer of a thin tabular shape including the first dielectric particles 12e is prepared. The dielectric layer is formed by pasting dielectric powder with a disperse medium such as an organic binder, forming the paste into prescribed shape and thickness by screen printing or the like, and thereafter decomposing and transpiring the disperse medium at the temperature in the range from 400° C. to 500° C. Then fluid dispersion (hereunder referred to as "sol solution") of the second dielectric particles 12f is dripped on the dielectric layer and the sol solution is impregnated into the dielectric layer. Thereafter, after excessive sol solution is removed with a spin coater, the dielectric layer is dried at the temperature in the range from 100° C. to 200° C. and then subjected to heat treatment at the temperature in the range from 400° C. to 500° C. The impregnation of sol solution, drying and heat treatment are generally repeated several times. Then finally, by applying heat treatment at a temperature of 700° C. or lower, the emitter 12 is formed. Here, in the above processes, as the dielectric layer before the sol solution is dripped, a green sheet or even a film formed by the aerosol deposition method can also be used.

Next, a preferable example of the heat treating process S3 is constructed below by referring FIG. 14. Here, FIG. 14 shows the photographs of the upper surface of the emitter 12 formed by the above-mentioned aerosol deposition method, these photographs are taken by the scanning electron microscope (SEM). FIG. 14(a) shows the state of the upper surface of the emitter without performing the heat treating process. FIG. 14(b) and (c) show the state of those after performing the heat treating process under the condition of in the range from 600° C. to 700° C. by radiating infrared ray from above the emitter with rapid thermal annealing (RTA) equipment. Note that the result of heating 30 minutes corresponds to FIG. 14(b). Also note that the result of heating 60 minutes corresponds to FIG. 14(c). The RTA equipment is constructed so as to heat an object instantaneously by radiating infrared ray from infrared lamps or infrared laser sources. An equipment which commercial name is MILA-3000 (manufactured by ULVAC-RIKO, Inc.) is an example of the RTA equipment which is applicable to the embodiment.

As shown in FIG. 14, crystal growth of the dielectric layer occurred by the heat treating process. The distribution of the sizes of the crystal grain that the proportion of the particles 1 μm or larger in size is 20% or more was obtained by the heat treating process which resulted in producing the dielectric layer shown in FIG. 14(b) or (c). Also, as shown in FIG. 14(b) and (c), the shape of the grain of the crystal which was grown by that process was less curved and more angular in comparison to the normal heat treating such as sintering around 900° C.

Especially, in case that the lower electrode 16 is a silver electrode, trace silver component invades the emitter 12 by diffusion from the lower electrode 16 and is scattered uniformly in the emitter 12 by the above-mentioned heat treating process, without mixing metal component intentionally with the dielectric layer at the process S2, forming the dielectric layer which comprises the emitter 12. That fact was ascertained by Electron Probe Micro-Analysis (EPMA) by X-ray Micro Analyzer (XMA).

And also ascertained is that the amount of electron emission of the electron emitter 10A with the emitter 12 which was processed by this heat treating process increased by 4 times or more compared to that without this heat treating process.

As mentioned above, growth of the grain of the crystal of the dielectric layer causes the emitter 12 which has dense dielectric structure to be obtained and the amount of electron emission to increase, by the above-mentioned heat treating process. Also, the emitter 12 which has a front face which surface roughness Ra meets the above-mentioned range can be obtained by simple manufacturing process because of the concavities (concavities 24 in FIG. 3) which is caused by the crystal grain boundaries of the grown crystal grains.

Further, by radiation of the infrared ray from above the dielectric layer which comprises the emitter 12, the dielectric layer is heated instantaneously while the glass substrate 11 is not heated by the infrared ray. Thus, it becomes possible to avoid the deformation of the glass substrate 11 which upper allowable temperature limit is low by raising its temperature up to the upper allowable temperature limit. Hence, the electron emitter 10A can be formed on a substrate which is less expensive and has relatively low heat resistance such as the glass substrate. And hence, the increase of the screen size and cost reduction of the FED are achieved.

As the dielectric material composing the emitter 12, a dielectric of a comparatively high relative dielectric constant, for example 1,000 or more, can preferably be adopted. As such a dielectric, adopted can be, besides barium titanate: a substance such as lead zirconate, lead magnesium niobate, lead nickel niobate, lead zinc niobate, lead manganese niobate, lead magnesium tantalate, lead nickel tantalate, lead antimony stannate, lead titanate, lead magnesium tungstate, or lead cobalt niobate; ceramics containing arbitrary combination thereof; a substance mainly containing a chemical compound composed of those substances by 50 wt. % or more; or a substance produced by further adding to the above ceramics oxides of lanthanum, calcium, strontium, molybdenum, tungsten, barium, niobium, zinc, nickel, manganese, or the like, the combination thereof, or other chemical compounds in an appropriate manner.

For example, in the case of binary system nPMN-mPT (n and m are mole fractions) including lead magnesium niobate (PMN) and lead titanate (PT), by increasing the mole fraction of PMN, the Curie point can be lowered and thus the relative dielectric constant at room temperature can be increased. In particular, the relative dielectric constant is preferably 3,000 or more in the case of n=0.85 to 1.0 and m=1.0−n. For example, a relative dielectric constant of 15,000 can be obtained at room temperature in the case of n=0.91 and m=0.09, and even 20,000 at room temperature in the case of n=0.95 and m=0.05.

Next, in the case of ternary system including lead magnesium niobate (PMN), lead titanate (PT) and lead zirconate (PZ), in addition to the increase of the mole fraction of PMN, to obtain a composition close to the morphotropic phase boundary (MPB) between tetragonal system and pseudo-cubic system or between tetragonal system and rhombohedral system contributes preferably to the increase of a relative dielectric constant. For example, particularly preferably, the relative dielectric constant is 5,500 in the case of PMN:PT:PZ=0.375:0.375:0.25 and the relative dielectric constant is 4,500 in the case of PMN:PT:PZ=0.5:0.375:325.

Further, it is preferable to improve a relative dielectric constant by further mixing metal such as platinum or silver with such a dielectric in the range allowing the insulativity to be secured. In this case, it is preferable, for example, to mix platinum by about 20% in weight (about 17% in volume) with a dielectric.

More specifically, for example, metallic fine particles the size of which is larger than that of the dielectric particles 12$f$ and smaller than that of the dielectric particles 12$e$ (for example about 0.01 to 1 μm) are mixed with the material powder 81 and/or 91. Thereby such a structure as shown in FIGS. 9 and 10 can easily be implemented.

That is, in FIGS. 9 and 10, the particle size of the dielectric particles contained in the material powder 81 composing the dielectric particles 12$e$ (hereunder referred to as "coarse particles") is much larger than that of the dielectric particles contained in the material powder 91 composing the dielectric particles 12$f$ (hereunder referred to as "fine particles"). Hence the kinetic energy of the coarse particles when the material powder 81 is sprayed through the nozzle 73 is much larger than the kinetic energy of the fine particles contained in the material powder 81 or 91 sprayed through the nozzle 73 or 74.

Hence, in some sizes and material quality of the coarse particles, there are cases where almost all of the coarse particles are flicked on the glass substrate 11 (on the lower electrode 16) and on the layers of the dielectric particles 12e and 12f (hereunder referred to as "formed layer"). In those cases, not only the layer of the coarse particles is hardly formed but also the coarse particles may damage the surface of the glass substrate 11, the surface of the lower electrode 16 and the formed layer. To cope with the problem, by mixing the metallic fine particles with the material powder 81 and/or 91 and thus making use of the ductility of metal (making metal work as a binder), the formed film can be well formed on the glass substrate 11.

Here, as metallic fine particles, besides the aforementioned platinum and silver, used can be fine particles of noble metal such as gold, silver or the like, base metal such as nickel, copper, iron or the like, or alloy such as silver-palladium, platinum-rhodium, brass or the like. In the case of alloy, the capability of forming a layer improves by properly adjusting the composition and thus regulating ductility, and therefore it is preferable to use alloy fine particles as the metal fine particles.

Further, a preferable mix rate is 0.01 to 20%, yet preferably 0.05 to 10% in volume.

Figure 15:
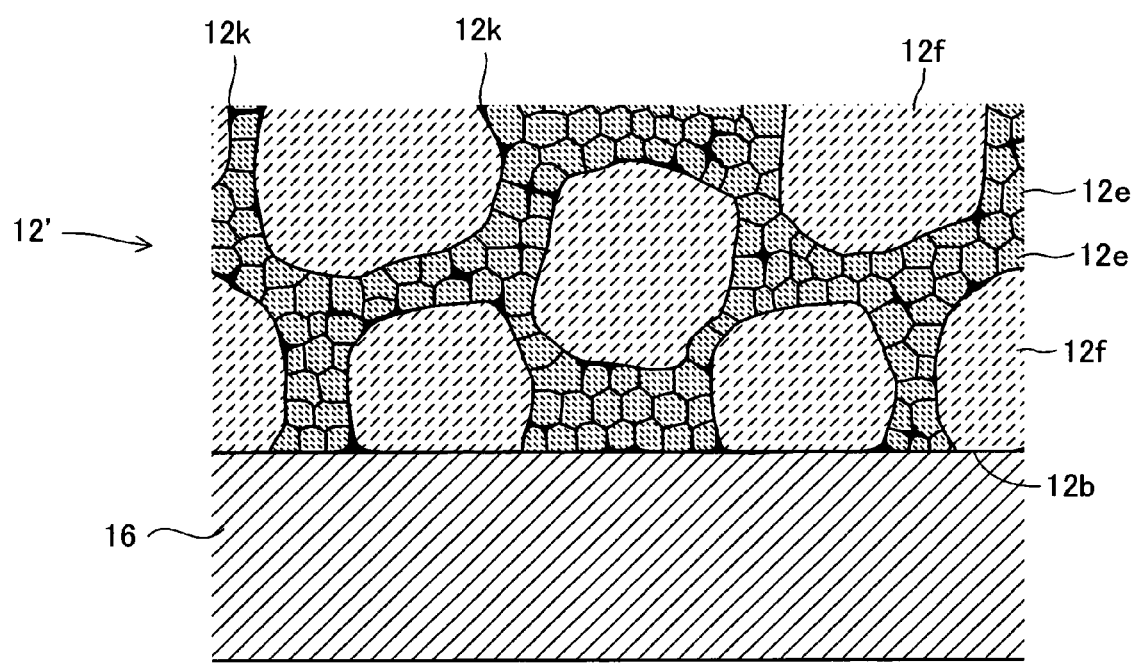
FIG. 15 is a sectional view showing an example of a modified emitter.

FIG. 15 is an enlarged sectional view of the vicinity of the emitter 12' in the case where the emitter 12' with which metal is mixed is applied to the configuration shown in FIG. 9. As shown in FIG. 15, the metal portions 12k are scattered between adjacent dielectric particles 12e and 12f in the emitter 12' and also between the emitter 12' and the lower electrode 16 (exist discontinuously in a scattered state, the same is applied hereunder).

By taking above measures, the metal portions 12k function as a binder between adjacent dielectric particles 12e and 12f in the emitter 12' and also between the emitter 12' and the lower electrode 16, and thereby the capability of forming the upper layer 12c and the lower layer 12d improves.

Further, by filling the gaps between adjacent dielectric particles 12e and 12f with the metal portions 12k, the dielectric constant of the emitter 12' increases and it becomes possible to realize good dielectric performances at the emitter 12'.

Further, in order not to electrically connect the upper electrode 14 (refer to FIG. 9) to the lower electrode 16 (so that the emitter 12' does not exhibit electrical conductivity in the thickness direction) through plural metal portions 12k, at least one gap is formed appropriately between adjacent plural metal portions 12k in the thickness direction of the emitter 12' (in the vertical direction in the figure). Thereby good dielectric properties (including piezoelectric and electrostrictive properties, electrification and electron emission properties, and the like) can stably be obtained at the emitter 12'.

Figure 16:
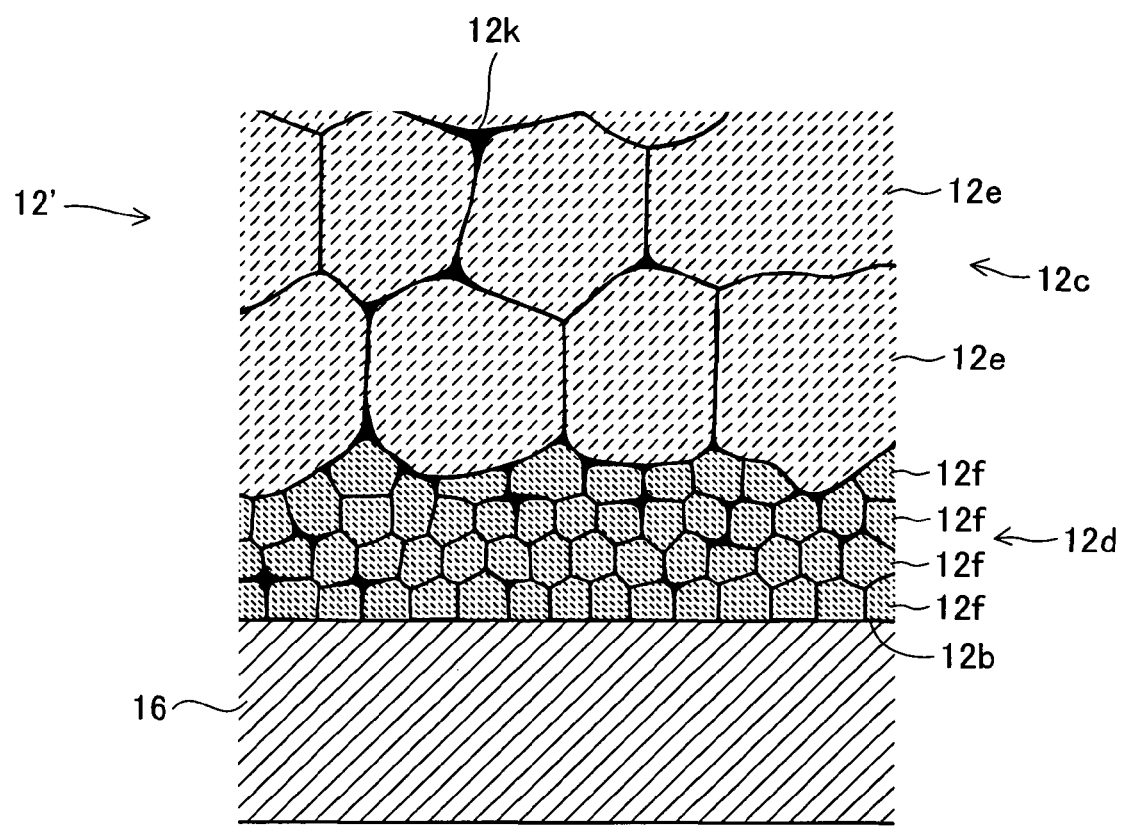
FIG. 16 is a sectional view showing an example of another modified emitter.

FIG. 16 is an enlarged sectional view of the vicinity of the emitter 12' in the case where the emitter 12' with which metal is mixed is applied to the configuration shown in FIG. 10. As shown in FIG. 16, the metal portions 12k are scattered between adjacent dielectric particles 12e in the upper layer 12c, between adjacent dielectric particles 12f in the lower layer 12d, and also between the upper layer 12c and the lower layer 12d in the emitter 12'. Further, the metal portions 12k are also scattered between the dielectric particles 12f composing the lower layer 12d and the lower electrode 16 formed on the glass substrate 11.

By taking above measures, the metal portions 12k function as a binder between adjacent dielectric particles 12e in the upper layer 12c, between adjacent dielectric particles 12f in the lower layer 12d, between the upper layer 12c and the lower layer 12d, and also between the lower layer 12d and the lower electrode 16, and thereby the capability of forming the upper layer 12c and the lower layer 12d improves. Further, it becomes possible to realize good dielectric properties at the emitter 12' in the same way as the case shown in FIG. 15.

Further, a piezoelectric and electrostrictive layer, an antiferroelectric layer, or the like can be used as the emitter 12 as stated above and, when a piezoelectric and electrostrictive layer is used as the emitter 12, as such a piezoelectric and electrostrictive layer, adopted can be, for example: a substance such as lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, or lead cobalt niobate; or ceramics containing the arbitrary combination thereof.

It goes without saying that a substance containing those chemical components by 50% or more in weight as the main component can also be used. Among the above ceramics, ceramics containing lead zirconate are most frequently used as a constituent material of a piezoelectric and electrostrictive layer composing the emitter 12.

Further, in the case of composing a piezoelectric and electrostrictive layer of ceramics, used may also be a ceramics produced by further adding to it: oxides of lanthanum, calcium, strontium, molybdenum, tungsten, barium, niobium, zinc, nickel, manganese, or the like; combination of some of them; or other chemical compounds in an appropriate manner. Furthermore, ceramics produced by adding $SiO_2$, $CeO_2$, $Pb_5Ge_3O_{11}$, or combination of some of them to the above ceramics may also be used. More specifically, a material produced by adding $SiO_2$ by 0.2 wt. %, $CeO_2$ by 3 wt. %, or $Pb_5Ge_3O_{11}$ by 1 to 2 wt. % to a PT-PZ-PMN system piezoelectric material may preferably be used. For example, it is preferable to use ceramics containing a component including lead magnesium niobate, lead zirconate, and lead titanate as the main component and further containing lanthanum and strontium. A piezoelectric and electrostrictive layer may be either dense or porous and, if porous, a preferable porosity is 40% or less.

In the case of using an antiferroelectric layer as the emitter 12, as the antiferroelectric layer, desirable is: a substance containing lead zirconate as the main component; a substance containing a component including lead zirconate and lead stannate as the main component; a substance produced by further adding lanthanum oxide to lead zirconate; or a substance produced by adding lead zirconate and lead niobate to a component including lead zirconate and lead stannate. Further, the antiferroelectric layer may be porous and, if porous, a preferable porosity is 30% or less.

Further, in the case of using strontium tantalate bismuthate ($SrBi_2Ta_2O_9$) as the emitter 12, polarization reversal fatigue is preferably small. Such a material having small polarization reversal fatigue is a laminar ferrodielectric chemical compound and expressed by the general expression $(BiO_2)^{2+}$ $(A_{m-1}B_mO_{3m+1})^{2-}$. Here, the ions of the metal A are $Ca^{2+}$, $Sr^{2+}$, $Ba^{2+}$, $Pb^{2+}$, $Bi^{3+}$, $La^{3+}$, etc. and the ions of the metal B are $Ti^{4+}$, $Ta^{5+}$, $Nb^{5+}$, etc. Further, it is also possible to render semiconducting capability by further adding an additive to piezoelectric ceramics of a barium titanate system, a lead zirconate system, or a PZT system. In this case, it is possible to allow an uneven electric field distribution to form in an emitter 12 and thus to concentrate electric fields in the vicinity of the interface with the upper electrode 14 that contributes to electron emission.

Furthermore, it is possible to lower the sintering temperature by mixing for example a glass component such as lead borosilicate glass or another low melting chemical compound (for example bismuth oxide or the like) with piezoelectric, electrostrictive and antiferroelectric ceramics.

Yet further, in the case of composing an emitter 12 of piezoelectric, electrostrictive and antiferroelectric ceramics, the shape thereof may be any of a solid sheet, a laminated sheet, or a shape formed by laminating or bonding one of them on a support substrate.

In addition, by using a non-lead type material as the emitter 12 and thus raising the melting point or the transpiration temperature of the emitter 12, the emitter 12 becomes unlikely to be damaged by the collision of electrons or ions.

As the conductive particles 15 composing the upper electrode 14 of the present embodiment, scale-like powder such as scale-like graphite powder or metallic powder, or acicular or rod-like powder such as carbon nanotube is preferably used. As a method for forming the upper electrode 14, used is the method including the processes of: dispersing the scale-like powder (while using a disperser if necessary) into an organic solvent (a binder) such as ethyl cellulose and thus forming paste; applying the paste by spin coating, screen printing, dipping, spraying, or the like and thus forming a thick film of the paste on the upper surface 12a of the emitter 12; and then subjecting the thick paste film to heat treatment. In the case of forming the thick film, when the viscosity of the paste is adjusted to about 100,000 to 200,000 cps so as to be suitable for the thick film forming, a preferable film thickness after printing is considered to be about 1 to 25 µm, more preferably about 3 to 15 µm. If the film thickness is excessive, the size of an opening 20 is too small and inversely, if the film thickness is too thin, the electrical conductivity in an upper electrode 14 cannot be secured. Then after the thick film in the above thickness range is formed, by applying heat treatment, the formed film to be the upper electrode 14 on the emitter 12 is transformed into only the electrode material along with the decomposition of the binder and simultaneously plural openings 20 are formed. As a result, without specific patterning treatment such as masking treatment being applied, plural openings 20 and overhangs 26 are formed in the upper electrode 14 as shown in FIG. 1 and other figures. Here, an inert gas, such as nitrogen, atmosphere is preferably used as the atmosphere during sintering (in particular when a carbonaceous material is used) but atmospheric air or an oxygen atmosphere (including in the decompressed state) can also be used if the compounding ratio of the conductive particles 15 in the paste is properly adjusted.

When the upper electrode 14 is formed, as stated above, it is preferable to add also conductive fine particles 19. As such conductive fine particles 19, besides metallic fine particles, carbonaceous fine particles such as spheroidized graphite powder, carbon black, or the like can be used. When conductive fine particles 19 are added, in addition to metallic fine powder classified into a prescribed particle size range, a substance that can be finally transformed into conductive fine particles by sintering can also be used, for example resinate or the like may be used.

When a carbonaceous material is used as the conductive particles 15 (particularly in an oxygen atmosphere such as the atmospheric air or the like), the temperature at the heat treatment of the upper electrode 14 is preferably 500° C. or lower and further, when conductive fine particles 19 are added, it is necessary to select a temperature at which the conductive fine particles 19 do not aggregation or cause grain growth in excess of a prescribed particle size.

Meanwhile, as the lower electrode 16, a material having electrical conductivity such as metal is used and the lower electrode 16 is composed of silver, platinum, molybdenum, tungsten, or the like. Further, the lower electrode 16 is: composed of a conductor showing resistance to a high-temperature oxidizing atmosphere, such as pure metal, alloy, mixture of insulative ceramics and pure metal, mixture of insulative ceramics and alloy or the like; or preferably composed of high-melting noble metal such as platinum, iridium, palladium, rhodium, molybdenum or the like, a substance mainly composed of alloy such as silver-palladium, silver-platinum, platinum-palladium or the like, or a cermet material composed of platinum or silver and ceramics. More preferably, the lower electrode 16 is composed of silver only, silver-based alloy, platinum only or a material mainly composed of platinum type alloy. Furthermore, as the lower electrode 16, a material of a carbon or graphite type may also be used. Here, the proportion of the ceramic material added to the electrode material is preferably 5 to 30% in volume. It goes without saying that the same material as used for the aforementioned upper electrode may also be used. Then when the lower electrode 16 is made of the aforementioned metal or carbonaceous material, the aforementioned thick film forming method is preferably used.

Figure 5C:
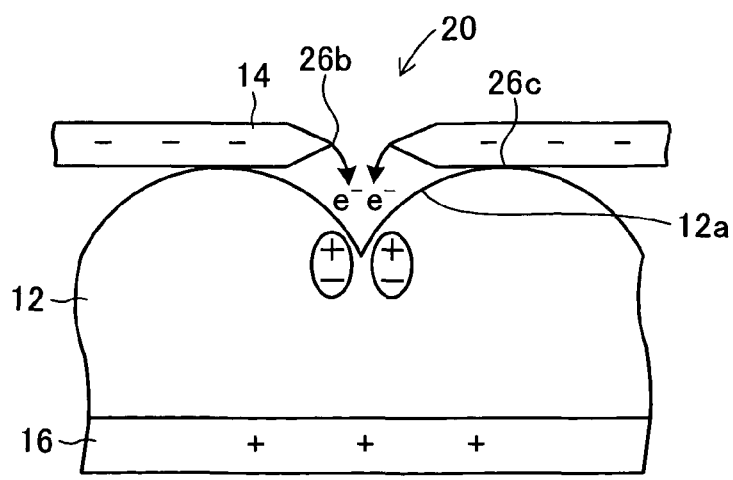

As precisely explained above, in an electron emitter 10A according to the present embodiment, the maximum distance d in the vertical direction between the upper surface 12a of the emitter 12 and the lower face 26a of a overhang 26 in the upper electrode 14 is set so as to satisfy the expression 0 µm<d≦10 µm and the surface roughness of the upper surface 12a is controlled in the range from 0.1 to 3 in Ra. That is, by increasing the surface roughness of the upper surface 12a of the emitter 12 to some extent, the area of the upper surface 12a on which electrons are held as shown in FIGS. 5C, 6A and 6B increases and the amount of emitted electrons increases more than ever.

On the other hand, if the surface roughness of the upper surface 12a of the emitter 12 is too large, the number of the sites where the depth of the concavities 24 (refer to FIG. 3) is too deep on the upper surface 12a of the emitter 12 increases. At those sites, the thickness direction, the direction of the dipoles shown in FIGS. 5 and 6, of the emitter 12 is nearly parallel with the inner surfaces of the concavities 24. Then as shown in FIG. 6A, the electrons once held on the inner surfaces of the concavities 24 are trapped again on the inner surfaces of the concavities 24 even when the polarization is reversed as shown in FIG. 6B (in other words, since the inner surfaces of the concavities 24 are nearly parallel with the polarization direction of the dipoles, a positive pole and a negative pole appear alternately on the inner surfaces of the concavities 24 and electrons are attracted to the positive pole). Thereby the number of electrons flying from the inner surfaces of the concavities 24 and passing through the apertures 20a of the openings 20 considerably decreases. Hence the surface roughness of the upper surface 12a of the emitter 12, though it may be increased, has an upper limit.

For that reason, the surface roughness of the upper surface 12a of the emitter 12 is limited in the range from 0.1 to 3 in Ra in the present invention. Thereby the upper surface 12a of the emitter 12 incomparably excellent in electron emission properties can be obtained. Here, the surface roughness in this case can be measured with a contact stylus-type surface roughness tester or laser scanning confocal microscope (for example, OLS1100 (commercial name) manufactured by OLYMPUS Corporation). Here, the surface roughness of the upper surface 12a of the emitter 12 can be set so as to meet one of the following two ranges; (1) in the range of Ra from 0.1 to 0.5, or (2) in the range of Ra from 0.5 to 3. For example, with consideration for the adhesiveness between the upper electrode 14 and the upper surface 12a of the emitter 12, the property of emission of electrons, or other factors, the roughness of the upper surface 12a of the emitter 12 can be set so as to meet one of the above-mentioned two ranges correspond to structural properties of the electron emitter 10A, such as properties of the upper electrode 14 (shape, method of forming, grain size or shape of the ingredient of the upper electrode 14, etc.), properties of the emitter 12 (method of forming, grain size of the ingredient, etc.).

Further, in an electron emitter 10A according to the present embodiment, by forming a overhang 26 at the upper electrode 14, a triple junction 26c is formed at a site other than the inner edge 26b of the upper electrode. Further, an opening 20 has such a shape as to allow the inner edge 26b of the opening 20 to serve as an electric field concentrated portion. Hence it is possible to further increase the number of the electric field concentrated portions than in the case where the overhangs 26 are not formed. In particular, since a overhang 26 in the present embodiment is formed so that it protrudes at an acute angle toward the inner edge 26b that is the tip of the overhang 26, the degree of electric field concentration is higher than the case where the shape of the inner edge 26b is a right angle or an obtuse angle and it becomes possible to increase the amount of the electrons accumulated on the upper surface 12a of the emitter 12.

Furthermore, in the upper surface 12a of the emitter 12, the maximum angle θ between the upper surface 12a (the face in the vicinity of the top of the convex portion of a jog) of the emitter 12 and the lower face 26a of a overhang 26 in the upper electrode 14 is set so as to satisfy the expression $1° \leq \theta \leq 60°$ and the maximum distance d in the vertical direction between the upper surface 12a of the emitter 12 and the lower face 26a of the overhang 26 in the upper electrode 14 is set so as to satisfy the expression $0 \mu m < d \leq 10 \mu m$, and by the configuration it becomes possible to increase the degree of the electric field concentration at a gap 28 and thus to increase the amount of the electrons accumulated on the upper surface 12a of the emitter 12.

Further, by forming the aforementioned overhang 26, a gap 28 is formed between the lower face 26a, opposite to the emitter 12, of the overhang 26 at the opening 20 in the upper electrode 14 and the emitter 12, most part of a drive voltage Va is substantially applied to the gap 28 by the influence of the electrostatic capacity of the virtual condenser at the gap 28, and thus the electric field at the opening 20 is intensified. Thereby it becomes possible to decrease the absolute value of the drive voltage Va required for obtaining the same field intensity at the opening 20.

Further, since the overhang 26 of the upper electrode 14 functions as a focus electron lens or a gate electrode (control electrode), the linearity of the emitted electrons can be improved. This is advantageous to the reduction of cross talk in the case of arraying many electron emitters 10A and using those, for example, as the electron sources of a display.

In addition, as stated above, the openings 20 are formed numerously in a region of the upper electrode 14 in a plan view, and the electric field concentrated portions at the inner edges 26b of the openings 20 and the triple junctions 26c are also formed numerously in a region of the upper electrode 14 in a plan view (they are formed numerously also at the positions corresponding to the outer edge 21 at the outer periphery (refer to FIG. 1) of the upper electrode 14). Thereby electrons are emitted uniformly without deviation in a region of the upper electrode 14 in a plan view.

Figure 17:
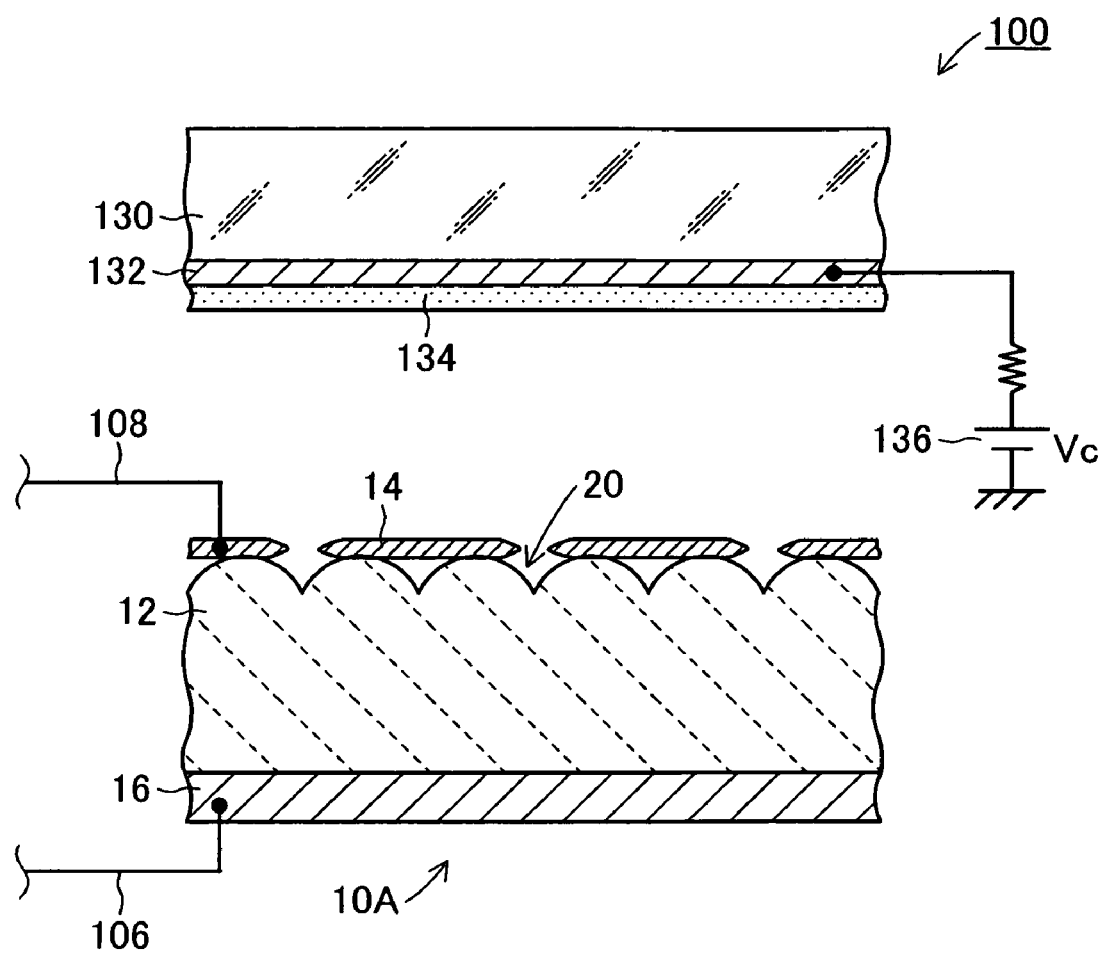
FIG. 17 is a configuration diagram showing an outline of a display to which the above electron emitter is applied.

Next, a display 100 using electron emitters 10A according to the present embodiment is explained on the basis of FIG. 17.

In the display 100, as shown in FIG. 17: a transparent plate 130 made of, for example, glass or acrylic is disposed above the upper electrode 14; a collector electrode 132 composed of, for example, a transparent electrode is disposed on the bottom surface (the face opposite to the upper electrode 14) of the transparent plate 130; and the collector electrode 132 is coated with a phosphor 134. Here, a bias voltage source 136 (collector voltage Vc) is connected to the collector electrode 132 via a resistance. Further, an electron emitter 10A is disposed in a vacuum atmosphere as stated above. The vacuum level in the atmosphere is preferably in the range from $10^2$ to $10^{-6}$ Pa, and more preferably in the range from $10^{-3}$ to $10^{-5}$ Pa.

The reason why such a range is selected is that, if the vacuum level is low, there arise the following risks; (1) since the gas molecules are abundant in the space, plasma tends to be generated and, if plasma is generated in too large quantity, a large number of positive ions collide with the upper electrode 14, resulting in the increase of damages, and (2) the emitted electrons undesirably collide with gas molecules before they reach the collector electrode 132 and the excitation of the phosphor 134 by the electrons fully accelerated by the collector voltage Vc is insufficiently secured.

On the other hand, if the vacuum level is high, though electrons are likely to be emitted from the points where electric fields concentrate, the problem is that the sizes of the supports of the structure and the sealing system for vacuum increase and thus that is disadvantageous for downsizing.

Figure 18:
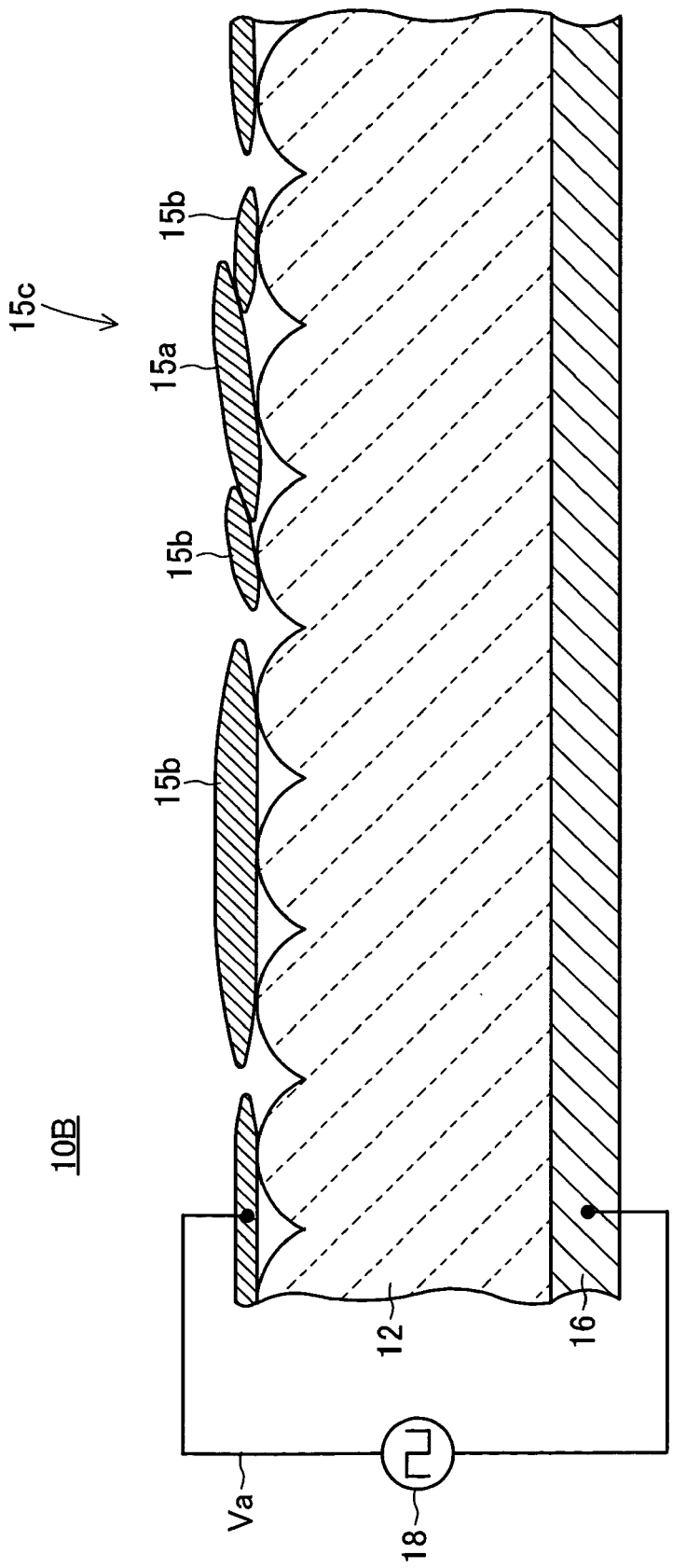
FIG. 18 is a sectional view showing an electron emitter, excluding some portions, according to the second embodiment.

Next, an electron emitter 10B according to the second embodiment is explained referring to FIG. 18. The electron emitter 10B according to the second embodiment has almost the same configuration as the aforementioned electron emitter 10A according to the first embodiment, but the conductive particles 15 composing the upper electrode 14 exist on the upper surface 12a of the emitter 12 not only as the primary particles 15b but also as the secondary particles 15c. Then the specific feature here is that the length of the secondary particles 15c in the longitudinal direction in a sectional side view is larger than the crystal grain size of a polycrystalline material composing the emitter 12. The electron emitter 10B according to the second embodiment has also the same functions and effects as shown by the aforementioned electron emitter 10A according to the first embodiment.

Figure 19:
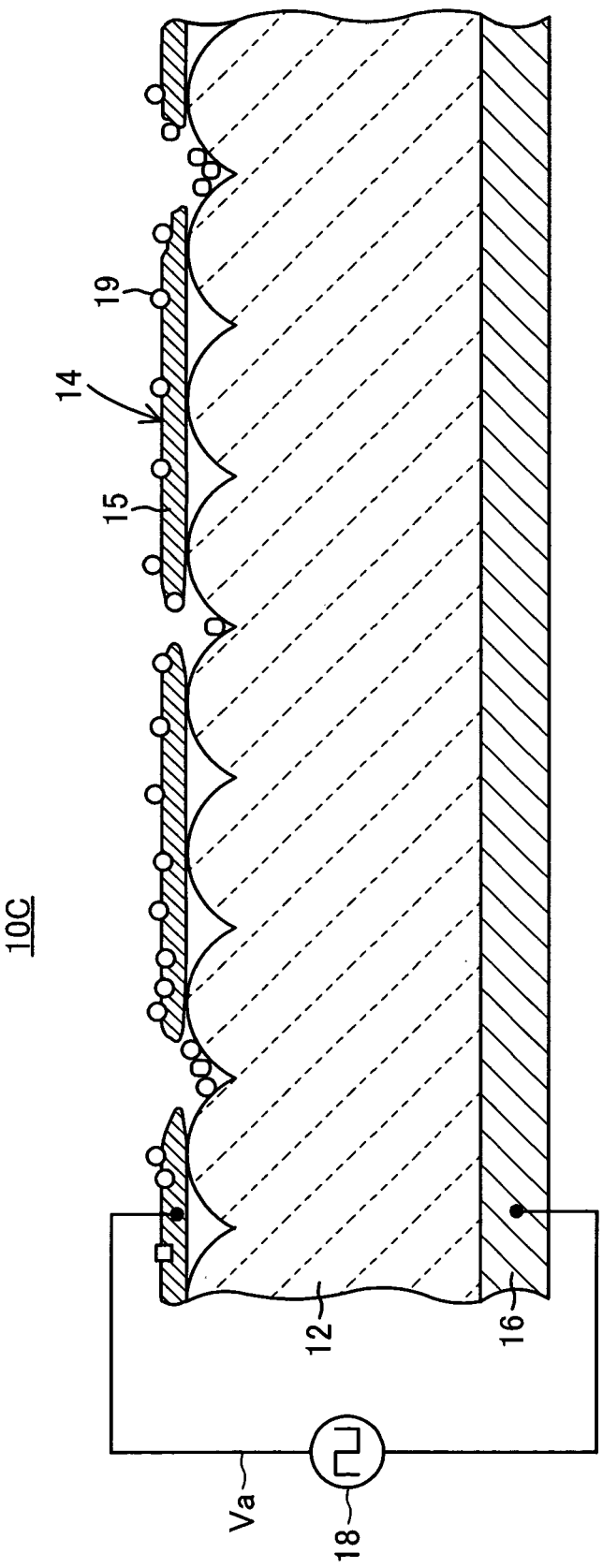
FIG. 19 is a sectional view showing an electron emitter, excluding some portions, according to the third embodiment.

Further, an electron emitter 10C according to the third embodiment is explained referring to FIG. 19. The electron emitter 10C according to the third embodiment has almost the same configuration as the aforementioned electron emitter 10A or 10B according to the first or second embodiment, but the upper electrode 14 is composed of, in addition to the same conductive particles 15 as above, the conductive fine particles 19. It is preferable that the size of such conductive fine particles 19 is nearly equal to or smaller than the thickness (the width thereof in the direction perpendicular to the longitudinal direction in a sectional side view) of the primary particles of the conductive particles 15. For example, when the thickness of the conductive particles 15 is about 2 μm, the average particle size of the conductive fine particles 19 is preferably 1 μm or less, and more preferably 0.5 μm or less. Thereby the electrical conductivity among the conductive particles 15 can easily be secured in the same upper electrode 14.

Here, it is preferable that the conductive fine particles 19 are exposed on the top surface of the upper electrode 14, in particular at the overhangs 26 as shown in FIG. 19. Thereby the conductive fine particles 19 exist like protrusions on the top surface of the upper electrode 14, thus the conductive fine particles 19 also serve as the electric field concentrated portions by the effect of the protruded shape, and hence the number of the sites of supplying electrons to the upper surface 12a of the emitter 12 can further be increased. Further preferably, the conductive fine particles 19 are also deposited on the upper surface 12a of the emitter 12 corresponding to the openings 20. Thereby fine float electrodes including the conductive fine particles 19 are also disposed on the emitter 12 composed of a dielectric material. The float electrodes are suitable for accumulating electrons emitted from the upper electrode 14 toward the emitter 12 in large quantity and can further increase the amount of emitted electrons in the electron emitter. For that reason, by composing the float electrodes of the conductive fine particles 19, as it is stated later, the float electrodes can be formed on the upper surface 12a of the emitter 12 through a simple process of, for example, mixing the conductive particles 15 with the conductive fine particles 19 and applying the mixture on the upper surface 12a of the emitter 12 when the upper electrode 14 is formed on the upper surface 12a of the emitter 12.

Further, when a carbonaceous material (for example graphite) is used as the conductive particles 15 and silver is used as the conductive fine particles 19 and then heating treatment is applied at the time of the forming of the upper electrode 14, during the heat treatment, since the graphite or the like in the vicinity of the silver fine particles is eroded by oxidation, the outer edge of the upper electrode 14 is likely to take the shape having a sharp edge or to have openings caused by perforation inside the electrode. Thereby the electric field concentrated portions further increase and it becomes possible to obtain a more suitable electrode configuration.

Note that, it is a matter of course that the present invention is not limited to the above examples and embodiments and can take various configurations as long as the essential portions of the present invention are not changed.

For example, the aforementioned surface roughness of the upper surface 12a of the emitter 12 according to the present invention can be obtained also by various methods other than the methods used in the above examples. For example, the conventional screen printing method or the green sheet method can also be used. Here, it is also acceptable to adjust the surface roughness and dielectric properties by depositing (laying) a piezoelectric sintering film having a (fractionized) prescribed surface roughness and dielectric properties on a piezoelectric film (hereunder referred to as "a base film") formed by the conventional screen printing method, the aerosol deposition method used in the above examples or another method. In this case, the base film functions as the dielectric film. Here, the piezoelectric sintering film can be integrated with the base film through heat treatment or the like. For the purpose of the integration, an additive such as glass, metal or the like can be added to the base film (when metal is added, the emitter 12' as shown in FIGS. 15 and 16 is formed). Thereby the base film and the piezoelectric sintering film are integrated through heat treatment at a relatively low temperature.

Further, in the above embodiments, the upper electrode 14 and the lower electrode 16 are formed on the different surfaces (the upper surface and the lower surface) of the emitter 12, but they may be formed on an identical surface (the upper surface).

Furthermore, a dielectric layer with which metal is mixed (refer to the emitter 12' in FIGS. 15 and 16) as stated above can be not only adopted in all the aforementioned embodiments but also applied to a dielectric device (a surface acoustic wave-device (SAW) or the like) other than an electron emitter. Here, as the method for mixing metal, in addition to the aerosol deposition method wherein metal is mixed with material powder 81, an arbitrary method such as diffusion from the lower electrode 16 with heating, vapor deposition, coatings or the like can be adopted. Further, with regard to the structure of a dielectric layer, not only a structure composed of two kinds of dielectric particles as shown in FIGS. 15 and 16 but also a structure composed of single kind of dielectric particles or a structure composed of three or more kings of dielectric particles (a multilayered structure) can be adopted.

Figure 20:
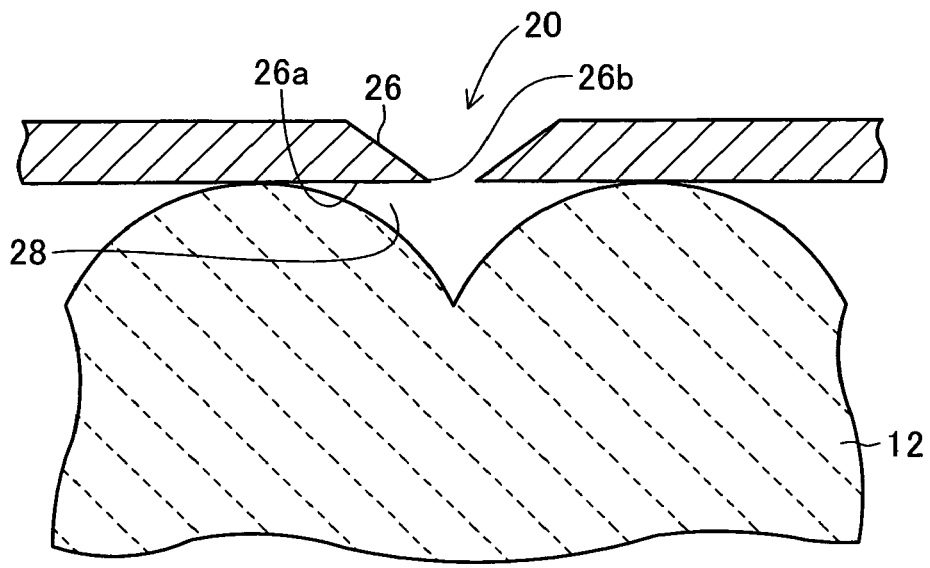
FIG. 20 is a sectional view showing an example of a modified overhanging shape at the upper electrode of the electron emitter according to the first to fourth embodiments.
Figure 21:
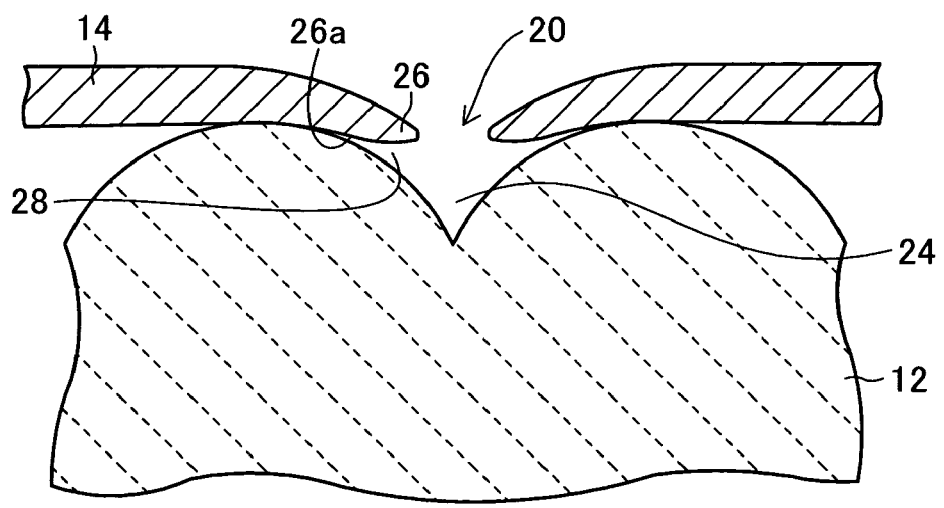
FIG. 21 is a sectional view showing an example of another modified overhanging shape at the upper electrode.
Figure 22:
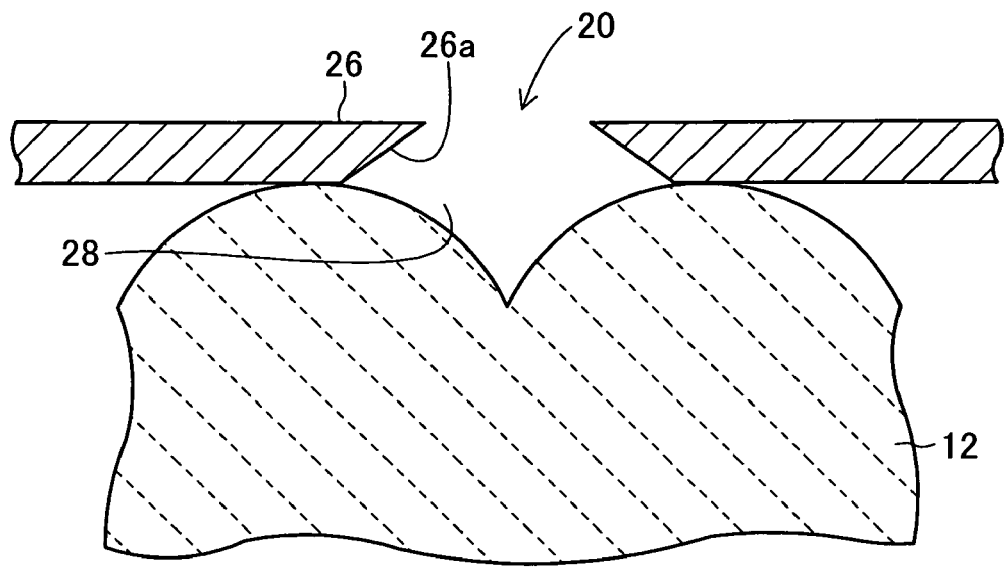
FIG. 22 is a sectional view showing an example of yet another modified overhanging shape at the upper electrode.
Figure 23:
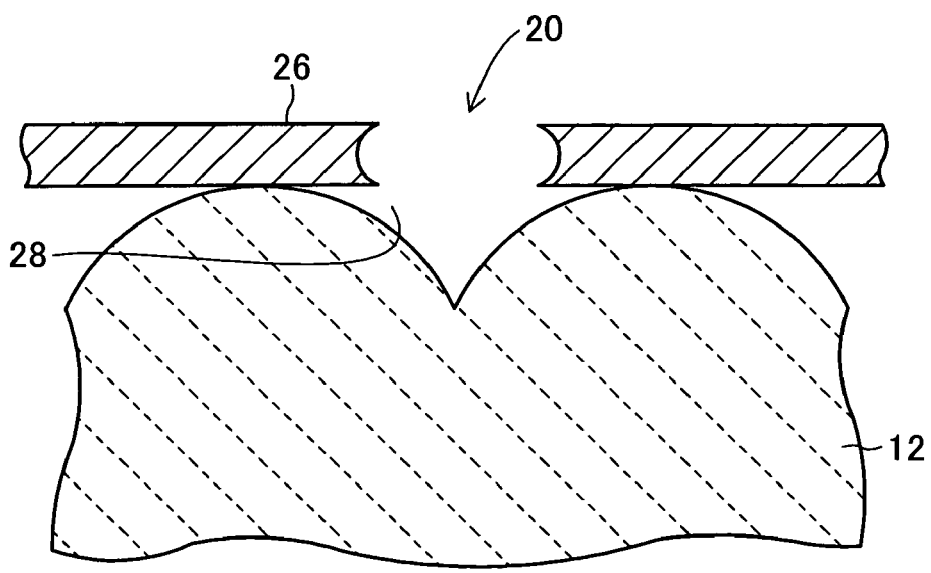
FIG. 23 is a sectional view showing an example of still another modified overhanging shape at the upper electrode.
Figure 24:
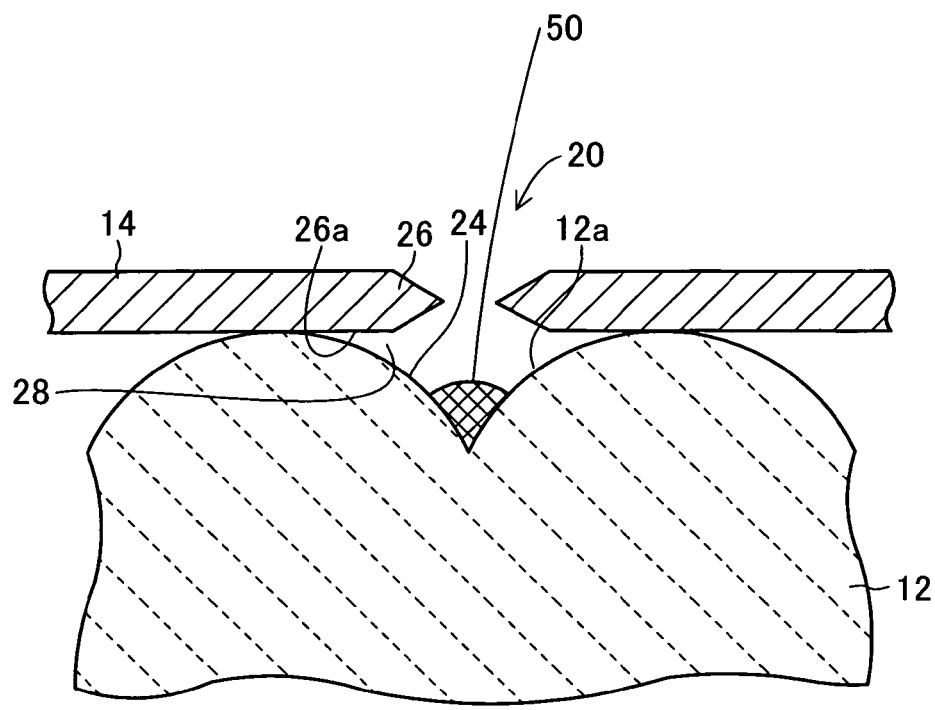
FIG. 24 is a sectional view showing an example of a modification provided with a float electrode in the electron emitter according to the first to fourth embodiments.

Further, with regard to the shape of an opening 20 serving as an electric field concentrated portion at the inner edge, in addition to the shapes explained in the above embodiments, various shapes may be adopted. For example, as shown in FIG. 20, such a shape that the lower surface 26a of the overhang 26 is nearly horizontally flat and the overhang 26 itself gradually tapers toward the inner edge 26b thereof may be adopted. Further, as shown in FIG. 21, the overhang 26 may be formed so that the overhang 26 itself gradually declines toward the concavity 24 of the emitter 12. Furthermore, as shown in FIG. 22, the lower face 26a of the overhang 26 may form an inclined plane directed upward toward the inner edge 26b thereof in a sectional side view. Furthermore, as shown in FIG. 23, the surface of the inner wall of the opening 20 may be formed into a hyperbolic shape. Further, as shown in FIG. 24, a floating electrode 50 may be formed at a portion, on the upper surface 12a of the emitter 12, corresponding to the opening 20.

Further, when an opening 20 having such a shape as to serve as an electric field concentrated portion at the inner edge thereof is adopted as stated above, the upper surface 12a of the emitter 12 formed by the aerosol deposition method and/or the sol impregnation method may be smooth like a mirror surface. Thereby, by selecting the shape of the opening 20, it becomes possible to secure a high packing density and a high dielectric constant of the emitter 12 while increasing the number of the electric field concentrated portions, and hence to increase the field intensity at the electric field concentrated portions and also increase the amount of the emitted electrons more than ever.

Further, in the sol impregnation method used in the above embodiments, a solution produced by dispersing dielectric fine particles in an organic solvent is used but, instead of the solution, a precursor solution, of dielectric fine particles, allowing the dielectric fine particles to be deposited by the function of heating or other reaction initiator may also be used.

Further, in the method of fabricating the electron emitter in the embodiment, the heat treating process S3 can be performed after the process S4 forming the upper electrode 14.

Further, as the heat treating process S3, radiation of the electromagnetic wave except the infrared ray (i.e. microwave) or exposure to the Plasma such as Inductively Coupled Plasma (ICP) may be selected.

Figure 25:
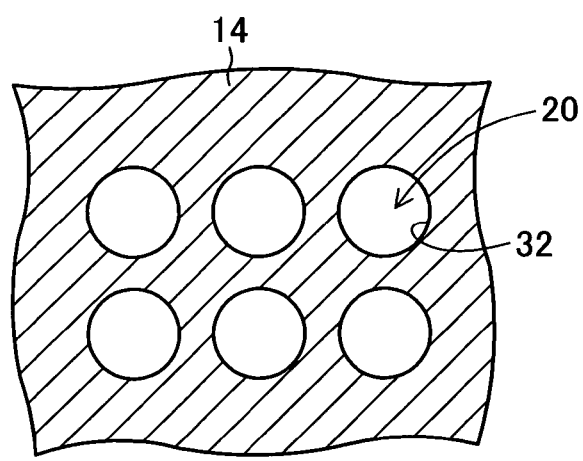
FIG. 25 is a view showing an example of a modified opening shape in an electron emitter according to the first to fourth embodiments.

Furthermore, in the production method used in the above embodiments, the opening 20 of the upper electrode 14 can be formed merely by forming a thick film by controlling the viscosity and compounding ratio of paste and the film thickness even though specific masking or the like is not applied, but, as shown in FIG. 25, the opening 20 may be formed by applying masking or the like so that a hole 32 of a specific shape is formed. In this case, the shape of the hole 32 is a perfect circle macroscopically but a deformed shape microscopically due to the influence of the shape of the conductive particles 15, and the hole 32 can exhibit the functions and effects in increasing the number of the sites where electrons are supplied to the emitter 12.

What is claimed is:

1. An electron emitter comprising:
an emitter comprised of a dielectric layer,
a first electrode formed on or above a surface of the emitter,
a second electrode formed on or above the emitter,
a substrate comprised of a material having an upper allowable temperature limit of 700° C. or less,
wherein the emitter is comprised of a polycrystalline substance, and the distribution of the sizes of the crystals of the polycrystalline substance is such that the proportion of particles 0.5 μm or larger in size is 20% or more, and
wherein the dielectric layer is formed from fine particles of a dielectric by the aerosol deposition method.

2. The electron emitter according to claim 1, wherein the first electrode is formed on a upper surface of the emitter and having an opening exposing the upper surface toward the outside of the electron emitter.

3. The electron emitter according to claim 2, wherein the second electrode formed on a lower surface opposite with the upper surface of the emitter.

4. The electron emitter according to claim 3, wherein the electron emitter has an air gap between a face opposite to the upper surface of the emitter at an edge of the first electrode and the upper surface of the emitter.

5. The electron emitter according to claim 4, wherein the edge of the first electrode is shaped so as to concentrate lines of electric force.

6. The electron emitter according to claim 5, wherein the first electrode is an aggregation of conductive particles having a shape extending in the longitudinal direction in a sectional side view, and the conductive particles are arranged so that the longitudinal direction is parallel with the upper surface of the emitter.

7. The electron emitter according to claim 6, wherein a metal component is mixed with the emitter.

8. The electron emitter according to claim 7, wherein the metal component is comprised of silver.

9. The electron emitter according to claim 8, wherein the second electrode is comprised of silver.

10. The electron emitter according to claim 1, wherein the emitter is processed by heating process by radiating an electromagnetic wave.

11. An electron emitter comprising:
an emitter comprised of a dielectric and a metal component,
a first electrode formed on or above a surface of the emitter,
a second electrode formed on or above the emitter,
a substrate comprised of a material having an upper allowable temperature limit of 700° C. or less,
wherein the emitter is comprised of a polycrystalline substance, and the distribution of the sizes of the crystals of the polycrystalline substance is such that the proportion of particles 0.5 μm or larger in size is 20% or more, and
wherein the emitter is formed from fine particles of the dielectric and the metal by the aerosol deposition method.

12. The electron emitter according to claim 11, wherein the first electrode is formed on a upper surface of the emitter and having openings exposing the upper surface toward the outside of the electron emitter.

13. The electron emitter according to claim 12, wherein the second electrode formed on a lower surface opposite with the upper surface of the emitter.

14. The electron emitter according to claim 13, wherein the electron emitter has an air gap between a face opposite to the upper surface of the emitter at an edge of the first electrode and the upper surface of the emitter.

15. The electron emitter according to claim 14, wherein the edge of the first electrode is shaped so as to concentrate lines of electric force.

16. The electron emitter according to claim 15, wherein the first electrode is an aggregation of conductive particles having a shape extending in the longitudinal direction in a sectional side view, and the conductive particles are arranged so that the longitudinal direction is parallel with the upper surface of the emitter.

17. The electron emitter according to claim 16, wherein the metal component is comprised of silver.

18. The electron emitter according to claim 17, wherein the second electrode is comprised of silver.

19. The electron emitter according to claim 11, wherein the emitter is processed by heating process by radiating an electromagnetic wave.

20. An electron emitter comprising:
an emitter comprised of a dielectric layer,
a first electrode formed on or above a surface of the emitter,
a second electrode formed on or above the emitter,
a substrate comprised of a material which upper allowable temperature limit is 700° C. or less,
wherein the emitter is comprised of polycrystalline substance, and the distribution of the sizes of the crystal of the polycrystalline substance is that the proportion of the particles 0.5 μm or larger in size is 20% or more.

21. The electron emitter according to claim 20, wherein the emitter is processed by heating process by radiating an electromagnetic wave.

22. The electron emitter according to claim 21, wherein a metal component is mixed with the emitter.

23. The electron emitter according to claim 22, wherein the metal component is comprised of silver.

24. The electron emitter according to claim 23, wherein the second electrode is comprised of silver.

* * * * *